(12) United States Patent
Behabtu et al.

(10) Patent No.: US 10,800,859 B2
(45) Date of Patent: Oct. 13, 2020

(54) POLYMERIC BLEND CONTAINING POLY ALPHA-1,3-GLUCAN

(71) Applicant: DuPont Industrial Biosciences USA, LLC, Wilmington, DE (US)

(72) Inventors: Natnael Behabtu, Wilmington, DE (US); Sandeep Kumar, Chandigarh (IN); Jayme L. Paullin, Exton, PA (US)

(73) Assignee: DuPont Industrial Biosciences USA, LLC, Wilmington, DE (US)

( * ) Notice: Subject to any disclaimer, the term of this patent is extended or adjusted under 35 U.S.C. 154(b) by 0 days.

(21) Appl. No.: 15/533,414

(22) PCT Filed: Dec. 17, 2015

(86) PCT No.: PCT/US2015/066317
§ 371 (c)(1),
(2) Date: Jun. 6, 2017

(87) PCT Pub. No.: WO2016/106068
PCT Pub. Date: Jun. 30, 2016

(65) Prior Publication Data
US 2017/0362345 A1    Dec. 21, 2017

Related U.S. Application Data

(60) Provisional application No. 62/095,429, filed on Dec. 22, 2014.

(51) Int. Cl.
| | |
|---|---|
| *C08B 37/00* | (2006.01) |
| *C08L 5/00* | (2006.01) |
| *C08K 3/013* | (2018.01) |
| *C08K 3/014* | (2018.01) |
| *C09D 105/00* | (2006.01) |
| *C08L 3/02* | (2006.01) |
| *C08L 23/04* | (2006.01) |
| *C08L 23/10* | (2006.01) |
| *C08L 67/04* | (2006.01) |
| *C08K 5/00* | (2006.01) |
| *C08J 5/18* | (2006.01) |
| *C08K 3/015* | (2018.01) |
| *C08L 77/00* | (2006.01) |

(52) U.S. Cl.
CPC .......... *C08B 37/0009* (2013.01); *C08J 5/18* (2013.01); *C08K 3/013* (2018.01); *C08K 3/014* (2018.01); *C08K 5/005* (2013.01); *C08L 3/02* (2013.01); *C08L 5/00* (2013.01); *C08L 23/04* (2013.01); *C08L 23/10* (2013.01); *C08L 67/04* (2013.01); *C09D 105/00* (2013.01); *C08K 3/015* (2018.01); *C08L 77/00* (2013.01)

(58) Field of Classification Search
CPC ................................................ C08B 37/0009
See application file for complete search history.

(56) References Cited

U.S. PATENT DOCUMENTS

| | | |
|---|---|---|
| 3,833,022 A | 9/1974 | Turbak et al. |
| 4,306,059 A | 12/1981 | Yokobayashi et al. |
| 4,501,886 A | 2/1985 | O'Brien |
| 4,963,298 A | 10/1990 | Allen et al. |
| 5,248,712 A * | 9/1993 | Takeuchi .............. C04B 35/634 524/56 |
| 5,296,286 A | 3/1994 | Allen et al. |
| 5,496,649 A | 3/1996 | Mallory et al. |
| 5,604,042 A | 2/1997 | Bianchini et al. |
| 5,712,107 A | 1/1998 | Nichols |
| 5,985,666 A | 11/1999 | Loiselle et al. |
| 6,087,559 A | 7/2000 | Nichols |
| 6,127,602 A | 10/2000 | Nichols |
| 6,127,603 A | 10/2000 | Nichols |
| 6,284,479 B1 | 9/2001 | Nichols |
| 6,323,265 B1 | 11/2001 | Bengs et al. |
| 6,410,025 B1 | 6/2002 | Lander |
| 6,444,750 B1 | 9/2002 | Touhaent |
| 6,465,203 B2 | 10/2002 | Nichols |
| 7,000,000 B1 | 2/2006 | O'Brien |
| 8,551,378 B2 | 10/2013 | Velev et al. |
| 8,642,757 B2 | 2/2014 | O'Brien et al. |
| 8,828,689 B2 | 9/2014 | Caimi et al. |
| 8,871,474 B2 | 10/2014 | Payne et al. |
| 8,962,282 B2 | 2/2015 | Caimi et al. |
| 9,034,092 B2 | 5/2015 | O'Brien |
| 9,075,423 B2 | 7/2015 | Zhu et al. |
| 9,080,195 B2 | 7/2015 | O'Brien et al. |
| 9,096,956 B2 | 8/2015 | Shiflett et al. |
| 9,139,718 B2 | 9/2015 | Paullin et al. |
| 9,212,301 B2 | 12/2015 | O'Brien et al. |
| 9,288,988 B2 | 3/2016 | Wachendorff-Neumann et al. |
| 9,334,584 B2 | 5/2016 | O'Brien et al. |
| 9,365,955 B2 | 6/2016 | Opper |
| 9,403,917 B2 | 8/2016 | Kasat et al. |
| 9,540,747 B2 | 1/2017 | O'Brien |
| 9,562,112 B2 | 2/2017 | Landschutze et al. |

(Continued)

FOREIGN PATENT DOCUMENTS

| | | |
|---|---|---|
| CN | 1262697 A | 8/2000 |
| EP | 0628284 A1 | 12/1994 |

(Continued)

OTHER PUBLICATIONS

Simpson et al., 'Four glucosyltransferases, GtfJ, GtfK, GtfL and GtfM from *Streptococcus salivarius* ATCC 25975,' Microbiology, 1995, vol. 141, pp. 1451-1460.

(Continued)

*Primary Examiner* — Eric Olson

(57) ABSTRACT

A polymeric blend composition comprising: (a) from about 1 to about 99 wt. % of a polymer; and (b) from about 1 to about 75 wt. % poly alpha-1,3-glucan is disclosed. The addition of alpha-1,3-glucan as a polymer filler can increase the tensile modulus, tensile strength and oxygen barrier properties of the polymeric blend composition.

25 Claims, No Drawings

(56) References Cited

U.S. PATENT DOCUMENTS

| | | |
|---|---|---|
| 9,644,322 B2 | 5/2017 | Massouda |
| 9,670,290 B2 | 6/2017 | Landschutze et al. |
| 9,695,253 B2 * | 7/2017 | Nambiar ............ C08B 37/0009 |
| 9,701,800 B2 | 7/2017 | Lenzing et al. |
| 9,708,417 B2 | 7/2017 | Cormier et al. |
| 9,714,403 B2 | 7/2017 | Nagy et al. |
| 9,771,548 B2 | 9/2017 | Nagy et al. |
| 10,005,850 B2 | 6/2018 | Kasat et al. |
| 10,030,323 B2 | 7/2018 | Durnberger et al. |
| 10,072,100 B2 * | 9/2018 | Nambiar ............ C08B 37/0009 |
| 10,087,479 B2 | 10/2018 | Fake et al. |
| 2004/0091581 A1 | 5/2004 | Joly et al. |
| 2013/0087938 A1 | 4/2013 | O'Brien et al. |
| 2013/0157316 A1 | 6/2013 | Caimi et al. |
| 2013/0161562 A1 | 6/2013 | O'Brien et al. |
| 2013/0161861 A1 | 6/2013 | O'Brien et al. |
| 2013/0168895 A1 | 7/2013 | Opper |
| 2013/0196384 A1 | 8/2013 | Caimi et al. |
| 2013/0214443 A1 | 8/2013 | Shiflett et al. |
| 2013/0244287 A1 | 9/2013 | O'Brien et al. |
| 2013/0244288 A1 | 9/2013 | O'Brien et al. |
| 2013/0313737 A1 | 11/2013 | O'Brien |
| 2014/0087431 A1 | 3/2014 | Payne et al. |
| 2014/0113821 A1 | 4/2014 | Charles et al. |
| 2014/0179913 A1 | 6/2014 | Paullin et al. |
| 2014/0187766 A1 | 7/2014 | Kasat et al. |
| 2014/0187767 A1 | 7/2014 | Kasat et al. |
| 2014/0323715 A1 | 10/2014 | Kasat et al. |
| 2014/0377545 A1 | 12/2014 | Karvitz et al. |
| 2015/0126730 A1 | 5/2015 | O'Brien |
| 2015/0191550 A1 | 7/2015 | Mishra et al. |
| 2015/0225877 A1 | 8/2015 | O'Brien |
| 2015/0232785 A1 | 8/2015 | Paullin et al. |
| 2015/0299339 A1 | 10/2015 | Shibakami et al. |
| 2015/0353649 A1 | 12/2015 | Paullin et al. |
| 2016/0053061 A1 | 2/2016 | Durnberger et al. |
| 2016/0053406 A1 | 2/2016 | Durnberger et al. |
| 2016/0060792 A1 | 3/2016 | Durnberger et al. |
| 2016/0122445 A1 | 5/2016 | Nambiar et al. |
| 2016/0138195 A1 | 5/2016 | Kraft et al. |
| 2016/0138196 A1 | 5/2016 | Roder et al. |
| 2016/0144065 A1 | 5/2016 | Roder et al. |
| 2016/0175811 A1 | 6/2016 | Behabtu et al. |
| 2016/0177471 A1 | 6/2016 | Kraft et al. |
| 2016/0230348 A1 | 8/2016 | Massouda |
| 2016/0251453 A1 | 9/2016 | Kasat et al. |
| 2016/0304629 A1 | 10/2016 | Kasat et al. |
| 2016/0311935 A1 | 10/2016 | Dennes et al. |
| 2016/0326268 A1 | 11/2016 | Cormier et al. |
| 2016/0326269 A1 | 11/2016 | Dennes et al. |
| 2016/0333117 A1 | 11/2016 | Massouda et al. |
| 2016/0333157 A1 | 11/2016 | Massouda et al. |
| 2017/0167063 A1 | 6/2017 | Behabtu |
| 2017/0196231 A1 | 7/2017 | Massouda et al. |
| 2017/0198108 A1 | 7/2017 | Mishra et al. |
| 2017/0198109 A1 | 7/2017 | Mishra et al. |
| 2017/0198322 A1 | 7/2017 | Cheng et al. |
| 2017/0198323 A1 | 7/2017 | Cheng et al. |
| 2017/0198324 A1 | 7/2017 | Cheng et al. |
| 2017/0204203 A1 | 7/2017 | Massouda et al. |
| 2017/0204232 A1 | 7/2017 | Mishra |
| 2017/0204442 A1 | 7/2017 | Cheng et al. |
| 2017/0208823 A1 | 7/2017 | Massouda et al. |
| 2017/0218093 A1 | 8/2017 | Cheng et al. |
| 2017/0267787 A1 * | 9/2017 | Nambiar ............ C08B 37/0009 |
| 2017/0298303 A1 | 10/2017 | Nagy et al. |
| 2018/0021238 A1 | 1/2018 | Huh et al. |
| 2018/0049457 A1 | 2/2018 | Cheng et al. |
| 2018/0066214 A1 | 3/2018 | Nagy et al. |
| 2018/0119357 A1 | 5/2018 | Behabtu et al. |
| 2018/0127682 A1 * | 5/2018 | Nambiar ................ A61Q 5/02 |
| 2018/0258590 A1 * | 9/2018 | Behabtu ................ D21H 19/72 |
| 2019/0186049 A1 | 6/2019 | Durnberger et al. |

FOREIGN PATENT DOCUMENTS

| | | | |
|---|---|---|---|
| EP | 0770002 B1 | 7/1995 | |
| WO | 9601736 A1 | 1/1996 | |
| WO | 2005/053765 A1 | 6/2005 | |
| WO | WO2006/036092 * | 4/2006 | ............ C08F 251/00 |
| WO | 2013/036918 A2 | 3/2013 | |
| WO | 2013/036968 A1 | 3/2013 | |
| WO | 2013/052730 A1 | 4/2013 | |
| WO | 2013/096502 A1 | 6/2013 | |
| WO | 2013/096511 A1 | 6/2013 | |
| WO | 2013/101854 A1 | 7/2013 | |
| WO | 2013/177348 A1 | 11/2013 | |
| WO | 2014/052386 A2 | 4/2014 | |
| WO | 2014/077340 A1 | 5/2014 | |
| WO | 2014/099724 A1 | 6/2014 | |
| WO | 2014/105696 A1 | 7/2014 | |
| WO | 2014/105698 A1 | 7/2014 | |
| WO | 2014/161018 A1 | 10/2014 | |
| WO | 2014/161019 A1 | 10/2014 | |
| WO | 2014/165881 A1 | 10/2014 | |
| WO | 2014/201479 A1 | 12/2014 | |
| WO | 2014/201480 A1 | 12/2014 | |
| WO | 2014/201481 A1 | 12/2014 | |
| WO | 2014/201482 A1 | 12/2014 | |
| WO | 2014/201483 A1 | 12/2014 | |
| WO | 2014/201484 A1 | 12/2014 | |
| WO | 2015/069828 A1 | 5/2015 | |
| WO | 2015/094402 A1 | 6/2015 | |
| WO | 2015/095046 A1 | 6/2015 | |
| WO | 2015/095358 A1 | 6/2015 | |
| WO | 2015/103531 A1 | 7/2015 | |
| WO | 2015/109064 A1 | 7/2015 | |
| WO | 2015/109066 A1 | 7/2015 | |
| WO | 2015/109164 A1 | 7/2015 | |
| WO | 2015/123323 A1 | 8/2015 | |
| WO | 2015/123327 A1 | 8/2015 | |
| WO | 2015/130881 A1 | 9/2015 | |
| WO | 2015/138283 A1 | 9/2015 | |
| WO | 2015/183721 A1 | 12/2015 | |
| WO | 2015/183724 A1 | 12/2015 | |
| WO | 2015/195777 A1 | 12/2015 | |
| WO | 2015/195960 A1 | 12/2015 | |
| WO | 2015/200590 A1 | 12/2015 | |
| WO | 2015/200596 A1 | 12/2015 | |
| WO | 2015/200612 A1 | 12/2015 | |
| WO | 2015183714 A1 | 12/2015 | |
| WO | 2015183722 A1 | 12/2015 | |
| WO | 2015183726 A1 | 12/2015 | |
| WO | 2015183729 A1 | 12/2015 | |
| WO | 20151200589 A1 | 12/2015 | |
| WO | 20151200593 A1 | 12/2015 | |
| WO | 20151200605 A1 | 12/2015 | |
| WO | WO2015/183721 * | 12/2015 | ............ C12P 19/18 |
| WO | 20161073732 A1 | 5/2016 | |
| WO | 20161105971 A1 | 6/2016 | |
| WO | 20161106011 A1 | 6/2016 | |
| WO | 2016126685 A1 | 8/2016 | |
| WO | 2016133734 A1 | 8/2016 | |
| WO | 2016160737 A1 | 10/2016 | |
| WO | 2016160738 A2 | 10/2016 | |
| WO | 2016160740 A1 | 10/2016 | |
| WO | 2016196021 A1 | 12/2016 | |

OTHER PUBLICATIONS

PCT International Search Report and Written Opinion for International Application No. PCT/US2015/066317, dated Mar. 30, 2016.
PCT International Search Report and Written Opinion for International Application No. PCT/US2015/037656, dated Oct. 7, 2015.
PCT International Search Report and Written Opinion for International Application No. PCT/US2015/037646, dated Oct. 7, 2015.
PCT International Search Report and Written Opinion for International Application No. PCT/US2015/037634, dated Sep. 22, 2015.
PCT International Search Report and Written Opinion for International Application No. PCT/US2015/037628, dated Sep. 22, 2015.
PCT International Search Report and Written Opinion for International Application No. PCT/US2015/037624, dated Oct. 12, 2015.

(56) References Cited

OTHER PUBLICATIONS

PCT International Search Report and Written Opinion for International Application No. PCT/US2015/037622, dated Sep. 22, 2015.
PCT International Search Report and Written Opinion for International Application No. PCT/US2015/011724, dated May 15, 2015.
PCT International Search Report and Written Opinion for International Application No. PCT/US2015/011551, dated Jul. 9, 2015.
PCT International Search Report and Written Opinion for International Application No. PCT/US2015/011546, dated May 28, 2015.
PCT International Search Report and Written Opinion for International Application No. PCT/US2015/010139, dated Apr. 29, 2015.
PCT International Search Report and Written Opinion for International Application No. PCT/US2014/044281, dated Sep. 11, 2014.
PCT International Search Report and Written Opinion for International Application No. PCT/US2013/076919, dated Mar. 3, 2014.
PCT International Search Report and Written Opinion for International Application No. PCT/US2013/076905, dated Mar. 4, 2014.
Ogawa et al: "Molecular and Crystal Structure of the Regenerated Form of (I->3)-alpha-d-glucan", International Journal of Biological Macromolecules, vol. 3, No. 1, Feb. 1, 1981, pp. 31-36.
Ogawa et al: "Crystal Structure of (1->3)-alpha-d-glucan", Waler-soluble Polymers: Synthesis, Solution Properties and Applications, American Chemical Society, vol. 141, Jan. 1, 1980, pp. 353-362.
Ogawa et al., 'X-ray Diffraction Data for (1>3)-alpha-d-glucan,' Carbohydrate Research, Oct. 1, 1979, vol. 75, pp. CI3-CI6.
Ogawa et al., 'Conformation of (1-3)-to-glucan tribenzoate,' Biosci Biotech Biochem, 1993, vol. 57 (10), pp. 1663-1665.
Ogawa et al, "X-ray Diffraction Data for (I->3)-alpha-d-glucan Triacetate", Carbohydrate Polymers, vol. 3, No. 4, Jan. 1, 1983, pp. 287-297.
"Applied Fibre Science", F. Happey, Ed, Chapter 8, Academic Press, New York, 1979 (Book not included).
Azizi et al., Preparation and Properties of Poly(vinyl alcohol)/Chitosan Blend Bio-nanocomposites Reinforced by Cellulose Nanocrystals, Chinese Journ. of Polymer Science, 2014, vol. 32, No. 12, pp. 1620-1627.
Paralikar et al., "Poly(vinyl alcohol)/cellulose nanocrystal barrier membranes", Journ. of Membrane Science, 2008, vol. 320, pp. 248-258.

\* cited by examiner

POLYMERIC BLEND CONTAINING POLY ALPHA-1,3-GLUCAN

This application is the National Stage application of International Application No. PCT/US15/66317 (filed Dec. 17, 2015), which claims the benefit of U.S. Provisional Application No. 62/095,429 (filed Dec. 22, 2014), all of which prior applications are incorporated herein by reference in their entirety.

FIELD OF DISCLOSURE

This disclosure is in the field of filled polymers. Specifically, this disclosure pertains to a polymeric blend composition using a polymer blended with poly alpha-1,3-glucan.

BACKGROUND

Driven by a desire to find new structural polysaccharides using enzymatic syntheses or genetic engineering of microorganisms or plant hosts, researchers have discovered polysaccharides that are biodegradable, and that can be made economically from renewable resource-based feedstocks. One such polysaccharide is poly alpha-1,3-glucan, a glucan polymer characterized by having alpha-1,3-glycosidic linkages. This polymer has been isolated by contacting an aqueous solution of sucrose with a glucosyltransferase enzyme isolated from Streptococcus salivarius (Simpson et al., *Microbiology* 141:1451-1460, 1995). Films prepared from poly alpha-1,3-glucan tolerate temperatures up to 150° C. and provide an advantage over polymers obtained from beta-1,4-linked polysaccharides (Ogawa et al., *Fiber Differentiation Methods* 47:353-362, 1980).

U.S. Pat. No. 7,000,000 disclosed the preparation of a polysaccharide fiber comprising hexose units, wherein at least 50% of the hexose units within the polymer were linked via alpha-1,3-glycosidic linkages using an *S. salivarius* gtfJ enzyme. This enzyme utilizes sucrose as a substrate in a polymerization reaction producing poly alpha-1,3-glucan and fructose as end-products (Simpson et al., 1995). The disclosed polymer formed a liquid crystalline solution when it was dissolved above a critical concentration in a solvent or in a mixture comprising a solvent. From this solution continuous, strong, cotton-like fibers, highly suitable for use in textiles, were spun and used.

What is needed is a biodegradable polymer additive that can blend with polymers to increase the tensile modulus of the polymeric blend.

SUMMARY OF DISCLOSURE

In a first embodiment, the disclosure concerns a polymeric blend composition comprising: (a) from about 1 to about 99 wt. % of a polymer; and (b) from about 1 to about 75 wt. % poly alpha-1,3-glucan.

In a second embodiment, the polymer is polyethylene, polypropylene, ethylene copolymer, polyvinyl butyrate, polylactic acid, polyvinyl alcohol, polyamide, polyether thermoplastic elastomers, polyesters, polyether esters, ethylene vinyl alcohol copolymers, starch or a combination thereof.

In a third embodiment, the polymer has a tensile strength and the polymeric blend composition has a tensile strength and the polymeric blend composition tensile strength is increased between about 10% and about 100% as compared to the polymer tensile strength.

In a fourth embodiment, the polymer has a tensile modulus and the polymeric blend composition has a tensile modulus and the polymeric blend composition tensile modulus is increased between about 10% and about 400% as compared to the polymer tensile modulus.

In a fifth embodiment, the polymer has an oxygen transmission rate and the polymeric blend composition has an oxygen transmission rate and the polymeric blend composition oxygen transmission rate is decreased between about 10% and less than 100% as compared to the polymer oxygen transmission rate.

In other embodiments, the disclosure relates to a polymeric blend composition wherein the tensile strength of the polymeric blend composition is increased between 10% and 100% as compared to the tensile strength of the polymer.

In other embodiments, the disclosure relates to a polymeric blend composition wherein the tensile modulus of the polymeric blend composition is increased between 10% and 400% when compared to the tensile modulus of the polymer.

In still further embodiments, the tensile modulus, the tensile strength and/or both the tensile strength and the tensile modulus of the polymeric blend composition are both increased when compared to the polymer.

In other embodiments, the disclosure relates to a polymeric blend composition wherein the oxygen transmission rate of the polymeric blend composition is decreased between 10% and less than 100% of the oxygen transmission rate of the polymer.

DETAILED DESCRIPTION

The disclosures of all patent and non-patent literature cited herein are incorporated herein by reference in their entirety.

As used herein, the term "embodiment" or "disclosure" is not meant to be limiting, but applies generally to any of the embodiments defined in the claims or described herein. These terms are used interchangeably herein.

Unless otherwise disclosed, the terms "a" and "an" as used herein are intended to encompass one or more (i.e., at least one) of a referenced feature.

The features and advantages of the present disclosure will be more readily understood, by those of ordinary skill in the art from reading the following detailed description. It is to be appreciated that certain features of the disclosure, which are, for clarity, described above and below in the context of separate embodiments, may also be provided in combination in a single element. Conversely, various features of the disclosure that are, for brevity, described in the context of a single embodiment, may also be provided separately or in any sub-combination. In addition, references to the singular may also include the plural (for example, "a" and "an" may refer to one or more) unless the context specifically states otherwise.

The use of numerical values in the various ranges specified in this application, unless expressly indicated otherwise, are stated as approximations as though the minimum and maximum values within the stated ranges were both proceeded by the word "about". In this manner, slight variations above and below the stated ranges can be used to achieve substantially the same results as values within the ranges. Also, the disclosure of these ranges is intended as a continuous range including each and every value between the minimum and maximum values.

The terms "poly alpha-1,3-glucan", "alpha-1,3-glucan polymer" and "glucan polymer" are used interchangeably herein. Poly alpha-1,3-glucan is a polymer comprising glucose monomeric units linked together by glycosidic linkages, wherein at least about 50% of the glycosidic linkages are alpha-1,3-glycosidic linkages. Poly alpha-1,3-glucan is a type of polysaccharide. The 1,3-linkage of the poly alpha-1,3-glucan can be illustrated as follows:

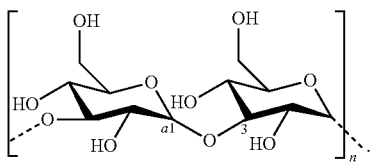

Poly alpha-1,3-glucan can be prepared using chemical methods. Alternatively, it can be prepared by extracting it from various organisms, such as fungi, that produce poly alpha-1,3-glucan. Alternatively still, poly alpha-1,3-glucan can be enzymatically produced from sucrose using one or more glucosyltransferase (gtf) enzymes (e.g., gtfJ), such as described in U.S. Pat. No. 7,000,000, and U.S. Patent Appl. Publ. Nos. 2013/0244288 and 2013/0244287 (all of which are incorporated herein by reference), for example. The hydroxyl groups on the glucan polymer are not chemically modified.

The percentage of glycosidic linkages between the glucose monomer units of the poly alpha-1,3-glucan that are alpha-1,3 is greater than or equal to 50%, 60%, 70%, 80%, 90%, 95%, 96%, 97%, 98%, 99%, or 100% (or any integer value between 50% and 100%). In such embodiments, accordingly, poly alpha-1,3-glucan has less than or equal to 50%, 40%, 30%, 20%, 10%, 5%, 4%, 3%, 2%, 1% or 0% (or any integer value between 0% and 50%) of glycosidic linkages that are not alpha-1,3.

The terms "glycosidic linkage" and "glycosidic bond" are used interchangeably herein and refer to the type of covalent bond that joins a carbohydrate (sugar) molecule to another group such as another carbohydrate. The term "alpha-1,3-glycosidic linkage" as used herein refers to the type of covalent bond that joins alpha-D-glucose molecules to each other through carbons 1 and 3 on adjacent alpha-D-glucose rings. This linkage is illustrated in the poly alpha-1,3-glucan structure provided above. Herein, "alpha-D-glucose" will be referred to as "glucose".

The terms "(meth)acrylic" and "(meth)acrylate" means acrylic and/or methacrylic and acrylate and/or methacrylate, respectively.

The term "salt of an ethylene/(meth)acrylic acid copolymer" means a copolymer comprising both ethylene and (meth)acrylic acid monomers wherein at least a portion of the carboxylic acid functional groups have been neutralized with one or more cations. Suitable cations can be one or more of a metal, an alkali metal, an alkaline earth metal, ammonia, a primary amine, a secondary amine, a tertiary amine or a combination thereof.

The term "polymeric blend" as used herein refers to a composition comprising two or more polymers. In some embodiments, the polymeric blend can be a homogeneous blend. In other embodiments, the polymeric blend can be a heterogeneous blend, wherein one polymer forms a continuous phase with the second polymer dispersed within the continuous phase. The poly alpha-1,3-glucan can be the continuous phase, while in other embodiments, the poly alpha-1,3-glucan can be the dispersed phase.

The terms "percent by weight (% by wt.)", "weight percentage (wt %)" and "weight-weight percentage (% w/w)" are used interchangeably herein. Percent by weight refers to the percentage of a material on a mass basis as it is comprised in a composition, mixture or solution.

The present disclosure is directed toward a polymeric blend composition comprising: (a) from about 1 to about 99 wt. % of a polymer; and (b) from about 1 to about 75 wt. % poly alpha-1,3-glucan, wherein the percentage by weight is based on the total weight of the polymeric blend composition. The polymeric blend composition can further comprise one or more additives, wherein the additives are pigments, surfactants, fillers, stabilizers, UV absorbers, dispersants, flame retardants, antimicrobial agents, plasticizers or a combination thereof. In some embodiments, the polymeric blend composition consists essentially of (a) from about 25 to about 99 wt. % of a polymer; and (b) from about 1 to about 75 wt. % poly alpha-1,3-glucan. In other embodiments, the polymeric blend composition consists essentially of (a) from about 1 to about 99 wt. % of a polymer; and (b) from about 1 to about 75 wt. % poly alpha-1,3-glucan and one or more additives. The percentages by weight are based on the total weight of the polymeric blend composition.

In other embodiments, the polymeric blend composition can comprise (a) from 25 to 99 wt. % of a polymer, and (b) from 1 to 75 wt. % poly alpha-1,3-glucan. In still further embodiments, the polymeric blend composition can comprise (a) from 40 to 95 wt. % of a polymer, and (b) from 5 to 60 wt. % poly alpha-1,3-glucan. The polymer can be polyethylene, polypropylene, ethylene copolymer, polyvinyl butyrate, polylactic acid, polyvinyl alcohol, polyamide, polyether thermoplastic elastomers, polyesters, polyether esters, ethylene vinyl alcohol copolymers, starch or a combination thereof.

The ethylene copolymer can be an ethylene/olefin copolymer, an ethylene/(meth)acrylic acid copolymer, a salt of an ethylene/(meth)acrylic acid copolymer, an ethylene/(meth)acrylate copolymer or a combination thereof. The polyesters can be aliphatic polyesters, aromatic polyesters, polyethylene terephthalate, polypropylene terephthalate, polytrimethylene terephthalate, polybutylene terephthalate or a combination thereof. Suitable polyetheresters can include, for example, copolymers comprising terephthalic acid and/or isophthalic acid along with polyalkylene glycols, for example, polyethylene glycol, polypropylene glycol, polytrimethylene glycol, polybutylene glycol or a combination thereof. Other suitable polyether esters can comprise polyether esters having repeat units from terephthalic acid and/or isophthalic acid along with a combination of both polyalkylene glycols having a number average molecular weight in the range of from 400 to 6,000 and alkylene glycols having having a molecular weight in the range of from 62 to 250, for example, ethylene glycol, 1,3-propane diol, 1,2-propylene glycol, 1,2-butylene glycol, 1,4-propylene glycol or a combination thereof. HYTREL® thermoplastic elastomers, available from Dupont are examples of commercially available polyetheresters. The polyamides can be nylon 6, nylon 10, nylon 12, nylon 6,6, nylon 6,10, nylon 6,12, a nylon blend thereof.

In some embodiments, the polymeric blend composition comprises (a) 75 to 95 wt % polyethylene and (b) 5 to 25 wt % poly alpha-1,3-glucan. In other embodiments, the polymeric blend composition comprises (a) 35 to 95 wt % polypropylene and (b) 5 to 65 wt % poly alpha-1,3-glucan. In other embodiments, the polymeric blend composition comprises (a) 55 to 95 wt % polylactic acid and (b) 5 to 35 wt % poly alpha-1,3-glucan. In other embodiments, the polymeric blend composition comprises (a) 45 to 95 wt % polyvinyl alcohol and (b) 5 to 55 wt % poly alpha-1,3- glucan. In other embodiments, the polymeric blend composition comprises (a) 85 to 95 wt % starch and (b) 5 to 15 wt % poly alpha-1,3-glucan. In other embodiments, the polymeric blend composition comprises (a) 60 to 95 wt % ethylene/methacrylic acid copolymer and (b) 5 to 40 wt % poly alpha-1,3-glucan. In other embodiments, the polymeric blend composition comprises (a) 65 to 95 wt % of a polyamide and (b) 5 to 35 wt % poly alpha-1,3-glucan. In other embodiments, the polymeric blend composition comprises (a) 55 to 95 wt % of a polyetherester and (b) 5 to 45 wt % poly alpha-1,3-glucan. In other embodiments, the polymeric blend composition comprises (a) 65 to 95 wt % of a polyester and (b) 5 to 35 wt % poly alpha-1,3-glucan. In other embodiments, the polymeric blend composition comprises (a) 95 to 60 wt % of an ethylene vinyl alcohol copolymer and 5 to 40 wt % poly alpha-1,3-glucan. The percentages by weight are based on the total weight of the composition.

The polymeric blend composition may be prepared using various methods known to one skilled in the art. For example, the polymeric blend composition may be blended in solution, followed by the removal of at least a portion of the solvent. The step of removing at least a portion of the solvent can be performed at ambient temperature, at ambient pressure, at reduced pressure, at elevated temperature or at a combination of reduced pressure and elevated temperature. In further embodiments, the solvent can be removed using a spray drying process. In other embodiments, the polymeric blend composition may be formed by melt blending. In another embodiment, the polymeric blend composition may be formed using one or more combinations of these methods, for example, blending in solution followed by melt blending.

The polymeric blend compositions can be useful for improving certain properties of the polymer. For example, the polymer has a tensile strength and the polymeric blend composition has a tensile strength and the polymeric blend composition tensile strength is increased between about 10% and about 100% as compared to the polymer tensile strength. In other embodiments, the tensile strength of the polymeric blend composition is increased as compared to the tensile strength of the polymer. In still further embodiments, the tensile strength of the polymeric blend composition is increased between 10% and 100% as compared to the tensile strength of the polymer. In each case, the tensile strength of the polymeric blend composition and of the polymer can be determined by methods known to those of ordinary skill in the art. The tensile strength and modulus in this disclosure were determined according to ASTM D638-03 or by ASTM D882, using an INSTRU-MET Instron model 1123.

In some embodiments, the polymer has a tensile modulus and the polymeric blend composition has a tensile modulus and the polymeric blend composition tensile modulus is increased between about 10% and about 400% as compared to the polymer tensile modulus. In other embodiments, the tensile modulus of the polymeric blend composition is increased between 10% and 400% as compared to the tensile modulus of the polymer.

In some embodiments, the polymer has an oxygen transmission rate and the polymeric blend composition has an oxygen transmission rate and the polymeric blend composition oxygen transmission rate is decreased between about 10% and less than 100% as compared to the polymer oxygen transmission rate. In other embodiments, the oxygen transmission rate of the polymeric blend composition is decreased between 10% and 100% as compared to the polymer. In this disclosure, the oxygen transmission rates were determined according to ASTM D3985-05 or ASTM F1927-07, using an OX-TRAN® model 2/21 testing system, available from Mocon, Inc. Minneapolis, Minn.

The polymeric blend composition may be used to make films and/or multilayer composite films. Such films may be used, for example, in packaging applications. In certain embodiments, the polymeric blend composition may be sandwiched between two polymer films to make a barrier structure.

Non-limiting examples of the embodiments disclosed herein include:

1. A polymeric blend composition comprising:
   (a) from about 1 to about 99 wt. % of a polymer; and
   (b) from about 1 to about 75 wt. % poly alpha-1,3-glucan.

2. The polymeric blend composition of embodiment 1, wherein the polymer is polyethylene, polypropylene, ethylene copolymer, polyvinyl butyrate, polylactic acid, polyvinyl alcohol, polyamide, polyether thermoplastic elastomers, polyesters, polyether esters, ethylene vinyl alcohol copolymers, starch or a combination thereof.

3. The polymeric blend composition of any one of embodiments 1 or 2 wherein the tensile strength of the polymeric blend composition is increased between 10% and 100% as compared to the tensile strength of the polymer.

4. The polymeric blend composition of any one of embodiments 1, 2, or 3 wherein the tensile modulus of the polymeric blend composition is increased between 10% and 400% as compared to the tensile modulus of the polymer.

5. The polymeric blend composition of any one of embodiments 1, 2, 3 or 4 wherein the oxygen transmission rate of the polymeric blend composition is decreased between 10% and less than 100% of the oxygen transmission rate of the polymer.

6. The polymeric blend composition of any one of embodiments 1, 2, 3, 4 or 5, wherein the composition further comprises one or more additives, wherein the additives are pigments, surfactants, fillers, stabilizers, UV absorbers, dispersants, flame retardants, antimicrobial agents, plasticizers or a combination thereof.

7. The polymeric blend composition of any one of embodiments 1, 2, 3, 4, 5 or 6, wherein the composition comprises (a) 75 to 95 wt % polyethylene and (b) 5 to 25 wt % poly alpha-1,3-glucan.

8. The polymeric blend composition of any one of embodiments 1, 2, 3, 4, 5 or 6, wherein the composition comprises (a) 35 to 95 wt % polypropylene and (b) 5 to 65 wt % poly alpha-1,3-glucan.

9. The polymeric blend composition of any one of embodiments 1, 2, 3, 4, 5 or 6, wherein the composition comprises (a) 55 to 95 wt % polylactic acid and (b) 5 to 35 wt % poly alpha-1,3-glucan.

10. The polymeric blend composition of any one of embodiments 1, 2, 3, 4, 5 or 6, wherein the composition comprises (a) 45 to 95 wt % polyvinyl alcohol and (b) 5 to 55 wt % poly alpha-1,3-glucan.

11. The polymeric blend composition of any one of embodiments 1, 2, 3, 4, 5 or 6, wherein the composition comprises (a) 85 to 95 wt % starch and (b) 5 to 15 wt % poly alpha-1,3-glucan.

12. The polymeric blend composition of any one of embodiments 1, 2, 3, 4, 5 or 6, wherein the composition comprises (a) 60 to 95 wt % ethylene/methacrylic acid copolymer and (b) 5 to 40 wt % poly alpha-1,3-glucan.

13. The polymeric blend composition of any one of embodiments 1, 2, 3, 4, 5 or 6, wherein the composition comprises (a) 65 to 95 wt % of a polyamide and (b) 5 to 35 wt % poly alpha-1,3-glucan.

14. The polymeric blend composition of any one of embodiments 1, 2, 3, 4, 5 or 6, wherein the composition comprises (a) 55 to 95 wt % of a polyetherester and (b) 5 to 45 wt % poly alpha-1,3-glucan.

15. The polymeric blend composition of any one of embodiments 1, 2, 3, 4, 5 or 6, wherein the composition comprises (a) 65 to 95 wt % of a polyester and (b) 5 to 35 wt % poly alpha-1,3-glucan.

16. The polymeric blend composition of any one of embodiments 1, 2, 3, 4, 5 or 6, wherein the composition comprises (a) 95 to 60 wt % of an ethylene vinyl alcohol copolymer and 5 to 40 wt % poly alpha-1,3-glucan.

Test Methods

Tensile Properties, for example, the tensile strength and tensile modulus, were determined according to ASTM D638-03 or ASTM, using an INSTRON™ model 1123 test frame, available from the Instru-Met Corporation, Union, N.J. Tensile bars were made as described in the examples section or molded using an model 221K 350-100 injection molding machine, available from ARBURG, Rocky Hill, Conn.

Oxygen Transmission Rate (OTR) and/or Oxygen Permeability was determined according to ASTM D3985-05 (example 4) or ASTM F1927-07 (example 6), using an OX-TRAN® model 2/21 testing system, available from Mocon, Inc. Minneapolis, Minn.

Examples

The disclosure is further defined in the following Examples. It should be understood that these Examples, while indicating certain preferred aspects of the disclosure, are given by way of illustration only. From the above discussion and these Examples, one skilled in the art can ascertain the essential characteristics of this disclosure, and without departing from the spirit and scope thereof, can make various changes and modifications to adapt it to various uses and conditions.

Preparation of Poly Alpha-1,3-Glucan

Poly alpha-1,3-glucan was prepared using a gtfJ enzyme preparation as described in U.S. Patent Appl. Publ. No. 2013/0244288, which is incorporated herein by reference in its entirety.

Polymeric Blend Compositions

Comparative Example A

Low density polyethylene (LDPE 1640) [0.923 g/cm3, melt flow index 4.5 g/10 min] (available from DuPont, Wilmington, Del.) was used as received. Tensile test strips were prepared and tested. The tensile properties are listed in Table 1.

Examples 1a and 1 b

A polymeric blend composition was made by continuously feeding and mixing in a twin screw extruder (30 mm Werner Pfleiderer, 9 blocks) 2 pounds per hour (pph) of poly alpha-1,3-glucan and 18 pph of low density polyethylene (LDPE) as described in Comparative Example A. The mixing was carried out in a continuous process with Barrel temperature of about 170° C. and screw speed of 150 revolutions per minute (rpm). The resulting polymeric blend composition was 10% by wt. poly alpha-1,3-glucan and was labeled as Example 1a. Both LDPE and poly alpha-1,3 glucan were fed at the back of the extruder. Another polymeric blend composition was made by feeding 4 pph poly alpha-1,3-glucan with 16 pph of LDPE using similar conditions as for Example 1a. The resulting compounded polymeric blend composition was 20% by wt. poly alpha-1,3-glucan, and was labeled as Example 1b. These polymeric blend compositions were formed into tensile test strips and tested. The tensile properties are listed in Table 1.

Comparative Example B

Polypropylene (PP) [PROFAX 6323 Homopolymer, 0.9 g/cm3, melt flow index: 12 g/10 min] (available from LyondellBasell Polymers) was used as received. Tensile test strips were prepared and tested. The tensile properties are listed in Table 1.

Examples 2a and 2b

A polymeric blend composition was made by continuously feeding and mixing in a twin screw extruder (30 mm Werner Pfleiderer, 9 blocks) 2 pounds per hour (pph) of poly alpha-1,3-glucan and 18 pph of PP as described in Comparative Example B. The mixing was carried out in a continuous process with Barrel temperature of 200° C. and screw rpm of 200. The resulting polymeric blend composition, 10% by wt. poly alpha-1,3-glucan was labeled Example 2a. Both PP and poly alpha-1,3 glucan were fed at the back of the extruder. Another polymeric blend composition was made by feeding 6 pph poly alpha-1,3-glucan with 14 pph of PP using similar conditions as given in Example 2a. The resulting polymeric blend composition, 30% by wt. poly alpha-1,3-glucan, was labeled Example 2b. These polymeric blend compositions were formed into tensile test strips and tested. The tensile properties can be seen in Table 2.

Comparative Example C

Polylactic acid (PLA) [PLA 2002D, Mn=124000, Mw 249000, Mw/Mn=2 (available from Natureworks, LLC, Blair, Nebr.) was used as received. Tensile test strips were prepared and tested. The tensile properties are listed in Table 1.

Examples 3a and 3b

A polymeric blend composition was made by continuously feeding and mixing in a twin screw extruder (30 mm Werner Pfleiderer, 9 blocks) 2 pounds per hour (pph) of poly alpha-1,3-glucan and 18 pph of PLA as described in Comparative Example C. The mixing was carried out in a continuous process with Barrel temperature of 180° C. and screw rpm of 200. The resulting polymeric blend composition, 10% by wt. poly alpha-1,3-glucan, was labeled Example 3a. Both PLA and poly alpha-1,3 glucan were fed at the back of the extruder. Another polymeric blend composition was made by feeding 6 pph poly alpha-1,3-glucan with 14 pph of PLA using similar conditions as for Example 3a. The resulting polymeric blend composition, 30% by wt. poly alpha-1,3-glucan, was labeled Example 3b. These polymeric blend compositions were formed into tensile test strips and tested. The tensile properties can be seen in Table 1.

TABLE 1

| Example | Polymer | Polymer (%) | Glucan (%) | Tensile (MPa) | Elongation (%) | Modulus (MPa) |
|---|---|---|---|---|---|---|
| A | LDPE | 100 | 0 | 12.7 | 173.7 | 98.1 |
| 1a | LDPE | 90 | 10 | 12.2 | 149.6 | 113.3 |
| 1b | LDPE | 80 | 20 | 11.2 | 123.4 | 135.6 |
| B | PP | 100 | 0 | 33.5 | 285.6 | 553.8 |
| 2a | PP | 90 | 10 | 28.7 | 47.3 | 700.8 |
| 2b | PP | 70 | 30 | 23.0 | 43.5 | 829.8 |
| C | PLA | 100 | 0 | 70.9 | 9.1 | 906.9 |
| 3a | PLA | 90 | 10 | 66.4 | 7.5 | 1117.3 |
| 3b | PLA | 70 | 30 | 50.2 | 5.4 | 1032.9 |

The Examples show increased tensile modulus over the base polymer (LDPE, PP or PLA) alone.

Comparative Example D

ELVANOL® 80-8, polyvinyl alcohol (PVOH), available from Kuraray America Inc., Houston, Tex. was used as received. Tensile test strips were prepared and tested. The tensile properties are listed in Table 2.

Examples 4a-4c

A solution based polymeric blend composition was made by dissolving ELVANOL® 80-8 in deionized (D.I.) water and heating the mixture at 90° C. with stirring using a magnetic stir bar until a clear solution was obtained. Glucan wet cake (42 wt % in water as measured by drying at 104° C. overnight) was re-dispersed to 9 wt % using an IKA rotor stator (12000 rpm, 2 minutes). The ELVANOL® PVOH solution and glucan slurry (9 wt %) were combined and mixed using a SPEEDMIXER™ DAC 150 mixer, available from FlackTec Inc., Landrum, S.C. for 3 minutes at 3500 rpm. Three different polymeric blend compositions were made (4a, 4b and 4c) to have increasingly higher contents of poly alpha 1,3-glucan. The dispersions were then cast into a film using a 50 mil (1270 micrometer) gap blade (Paul N. Gardner Company, INC., P.G.&T. Co. #2) on premium Inkjet Transparency films from Hewlett Packard. The dispersions were allowed to evaporate water at room temperature. Once the films were dried, they were peeled off the casting substrate. From the free-standing film, tensile bars were then cut out using a JDC Precision sample cutter and conditioned overnight at 65% relative humidity. The tensile bars were then tested on an Instron model 1123 according to ASTM D882. The tensile properties are listed in Table 2.

TABLE 2

| Example | Polymer | Polymer (%) | Glucan (%) | Tensile (MPa) | Elongation (%) | Modulus (MPa) |
|---|---|---|---|---|---|---|
| D | PVOH | 100.0 | 0.0 | 24.7 | 95.5 | 892.2 |
| 4a | PVOH | 95.8 | 4.2 | 38.4 | 87.6 | 1919.7 |
| 4b | PVOH | 78.3 | 21.7 | 40.5 | 10.3 | 2339.6 |
| 4c | PVOH | 52.5 | 47.5 | 32.6 | 1.1 | 3362.2 |

The Examples show increased tensile strength and modulus over the base polymer (PVOH) alone.

Examples 4d and 4e

Examples 4d and 4e were made in a similar way to Examples 4a-4c. ELVANOL® 70-62 PVOH was used as Control E and different amounts of poly alpha-1,3-glucan were used to prepare polymeric blend compositions having 7.7 and 35.8% by wt. of the poly alpha-1,3-glucan. A thin coating was applied on a Mylar 48 GA LBT (0.67 mil (17.0 micrometers) for the control sample and 0.62 mil (15.7 micrometers) for Example 4d). Example 4e was measured as a free standing film as it could easily be peeled off from Mylar substrate (2 mil thickness), while Comparative Example E and Example 4d were measured on the support substrate. The reported thickness refers to the coating thickness (not the overall Mylar+coating thickness). Since Mylar has poor oxygen barrier properties, its influence to the overall barrier properties was neglected. Comparative Example E and Examples 4d and 4e were tested for oxygen transmission rate measured at 23° C. and 50% relative humidity and the data were listed in Table 3.

TABLE 3

Oxygen Transmission Rate (OTR) of Solution Based Polymeric Blends

| Example | Polymer | Polymer (%) | Glucan (%) | OTR (cc/m$^2$/day) |
|---|---|---|---|---|
| E | PVOH | 100 | 0 | 0.092 |
| 4d | PVOH | 92.3 | 7.7 | 0.197 |
| 4e | PVOH | 64.2 | 35.8 | 0.027 |

The Examples show low oxygen transmission rate, a quality required in many packaging application. Even high addition of glucan polymer (35.8 wt % relative to PVOH) allow for lower OTR (lower than the reference PVOH polymer).

Examples 5a-5c

A solution based polymeric blend composition was made by dissolving Tapioca starch and glycerol in D.I. water (250 grams of water, 10 grams of starch, 2.5 grams of glycerol) by heating the mixture at 90° C. and stirring with a magnetic stir bar until a clear solution was obtained (Comparative Example F). Example 5a was obtained by adding 500 mg of dried glucan powder (D50-20 micrometer (μm)) to the composition of Comparative Example F. The glucan powder was added while starch was still in its slurry (undissolved) phase. The glucan powder was added slowly to avoid formation of glucan powder clumps and the whole system was heated until starch dissolution. Starch dissolution was easily noticeable as the system increased in shear viscosity (Example 5a). Example 5b was made similarly to Example 5a. However, the glucan source was 10 wt % dispersion of glucan wet cake (42 wt % as measured by drying at 104° C. overnight), re-dispersed to 10 wt % using an IKA rotor stator (12000 rpm, 2 minutes). Five grams of the 10 wt % dispersion was added in the same composition as Comparative Example E, while starch was still in its slurry phase and heated until a viscous solution was obtained. Example 5c was obtained using a similar solution making process as Example 5b, with the difference that 15 grams of 10 wt % glucan dispersion was used. The solutions thus obtained were cast on to disposable polystyrene petri dishes (100×15 mm) until the dishes were full. The solutions were then allowed to evaporate water at room temperature. Once the films were dried, they were peeled off the casting substrate. From the free-standing film, tensile bars were then cut out using JDC Precision sample cutter and conditioned overnight at 65% relative humidity. The tensile bars were then tested on an Instron model 1123 according to ASTM D882. The tensile properties are listed in Table 2.

TABLE 4

Tensile Properties of Solution Based Polymeric Blend Compositions

| Example | Polymer | Polymer (%) | Glucan (%) | Tensile (MPa) | Elongation (%) | Modulus (MPa) |
|---------|---------|-------------|------------|---------------|----------------|---------------|
| F       | Starch  | 100.0       | 0.0        | 5.2           | 60             | 165           |
| 5a      | Starch  | 95          | 5          | 8.1           | 6.8            | 336           |
| 5b      | Starch  | 95          | 5          | 20.0          | 3.3            | 910           |
| 5c      | Starch  | 85          | 15         | 18.5          | 2.9            | 1010          |

The Examples show that the addition of alpha-1,3-glucan can increase both tensile strength and modulus of starch films. This is particularly attractive in an application such as thermoplastic starch trash bags where strength as well as biodegradability are desired. In fact, glucan can increase starch mechanical performance. Also, because glucan is a polysaccharide (much like starch and cellulose) it is also biodegradable.

Examples 6a-6d and 7a-7d

Polymeric blend Compositions of alpha-1,3-glucan at 5%, 10%, 20%, 35 wt. % loading with respect to PVOH (ELVANOL® 90-50) were produced, to give Examples 6a, 6b, 6c and 6d, respectively. Separately, dispersions of a poly alpha-1,3-glucan were prepared using a 40% by weight wet cake (40% poly alpha-1,3-glucan/60% water) First, dispersions of glucan in water were produced by adding 0.5 (wet cake 1.25 g), 1.0 (wet cake 2.5 g), 2.0 (wet cake 5 g) and 3.5 (wet cake 8.75 g) grams of glucan, respectively to vessels containing 100 milliliters of water. Each dispersion was sonicated for 6 hours (hrs.) using a VIBRA CELL™ ultrasonic processor (available from Sonics & Materials, Inc., Newtown, Conn.) at 60% amplitude and probe tip diameter of 13 mm. The dispersion was allowed to rest overnight with no agitation. In some cases, depending upon the amount of glucan in water, the glucan suspension was found to have settled, leaving a clear layer of water at the top of the vessel. This clear layer of water was decanted and the remainder was sonicated again for 4 hrs. and stirred. Separately, solutions of 9.5, 9.0, 8.0 and 6.5 grams of ELVANOL® 90-50 PVOH were dissolved in 50 ml of water at 90° C. for 2 hr. Next, the ELVANOL® 90-50 PVOH solutions and the glucan dispersions were mixed. The 0.5 gram glucan dispersion was mixed with the 9.5 gram PVOH solution; the 1.0 gram glucan dispersion was mixed with the 9.0 gram PVOH solution; the 2.0 gram glucan dispersion was mixed with the 8.0 gram PVOH solution; and the 3.5 gram glucan dispersion was mixed with the 6.5 gram PVOH solution. The mixtures were stirred overnight at 500-600 rpm, followed by 1-2 hr. probe sonification. Before casting the 5, 10 and 20 wt % glucan mixtures, the water from the mixture was reduced under stirring conditions at 60° C. to 70 ml in order to increase the viscosity of the mixture. However for the 35 wt % mixture, no water was removed from mixture before casting and making coating. A film of the ELVANOL® 90-50 PVOH was cast separately to give Comparative Example G.

Adhesive tape having a thickness of 1 millimeter (mm) was placed over the fours edges of a glass plate having dimensions of 150 mm by 100 mm. The solutions produced above were poured onto the glass plates and the solution was spread over the glass uniformly using a glass rod. The coated solution was dried at 40° C. overnight and then dried at 60° C. for 8-12 hr. After drying, the films were removed from the glass surface. The films were shown to have a thickness of 77-90 micrometers.

Coating process of ELVANOL® PVOH/Glucan over corona treated polyethylene (PE): Corona treated PE having a thickness of about 45 µm was cut into a size of 100 mm×50 mm, placed over glass and then adhesive tape, with thickness 1 mm, and was fixed on four sides to the corona sheet covered glass. Next, the solutions produced above were poured onto the corona treated PE and were spread with a glass rod to form a uniform layer. The coatings were first dried at 40° C. overnight and then dried at 60° C. for 8-12 hr., to give examples 7a, 7b, 7c and 7d. The coating thickness of ELVANOL®/Glucan CD composite over corona treated PE was about 21 µm. The ELVANOL® 90-50 PVOH was also coated onto the corona treated PE in the same manner to give comparative example H.

The films and coated samples were cut and used for testing for Oxygen barrier, creep, dynamic mechanical analysis, UV spectroscopy and SEM for dispersion.

The films were then tested for Oxygen permeability and oxygen transmission at 23° C. and 50% and 90% relative humidity according to ASTM F1927-07. The oxygen permeability and transmission data is given in units of cc-mil/m2/day. Due to the variation in thickness of the films/coatings, Oxygen permeation data was measured as oxygen transmission may vary with the film thickness. In each test, the size of composite films used for barrier was 5×50 centimeters (cm). The data summarized in Table 5 is the average of two trials.

TABLE 5

| Example | Oxygen Permeation at 50% RH | At 90% RH Permeation | Oxygen Transmission at 50% RH | At 90% RH transmission |
|---------|-----------------------------|----------------------|-------------------------------|------------------------|
| G       | 3.83                        | Not determined       | 1.07                          | Not determined         |
| 6b      | 2.09                        | 4.24                 | 0.69                          | 1.40                   |
| 6d      | 1.64                        | 2.71                 | 0.74                          | 1.23                   |
| H       | 4.23                        | 8.98                 | 2.16                          | 4.56                   |
| 7b      | 1.65                        | 2.95                 | 0.65                          | 1.18                   |
| 7d      | 0.89                        | 1.05                 | 0.33                          | 0.39                   |

Examples 6b, 6c and 6d were tested for Creep using a DMA Q800 analyzer (available from TA Instruments, New Castle, Del.) with tensile mode at 140° C. and an applied stress level of 5 MPa. The rectangular specimens of the nanocomposites films were subjected to 5 MPa creep stress for 20 min at 140° C., and then samples were relaxed for 30 min.

Examples 6b and 6c were analyzed for light transmittance at 400 and 650 nanometers (nm) and using a LAMBDA® 35 UV/Vis spectrophotometer, available from Perkin-Elmer, Waltham, Mass. The data is summarized in Table 6.

TABLE 6

| Sample | Creep (Strain %) @ 5 MPa for 20 min at 140° C. | Creep (Strain %) after recovery | % Light transmission @ 400 nm | % Light transmission @ 650 nm |
|--------|------------------------------------------------|---------------------------------|-------------------------------|-------------------------------|
| G      | 194                                            | 138                             | 92.8                          | 94.3                          |
| 6b     | 43                                             | 29                              | 90.8                          | 92.4                          |
| 6c     | 19                                             | 10                              | 90.2                          | 91.6                          |
| 6d     | 6                                              | 3                               | 88.0                          | 90.3                          |

Rated visually, the PVOH/glucan films were hazy, but upon contact with a surface, the films had visual clarity.

Examples 8a-8k and 9a-9c

Melt blend compositions of polypropylene/glucan and polylactic acid/glucan were prepared. The polypropylene and polylactic acid had the following properties, shown in Table 7.

TABLE 7

| Property | polypropylene | polylactic acid |
|---|---|---|
| Melt Flow Index (ISO 1133, 190° C./2.16 kg) | 45 g/10 min | 40 g/10 min |
| Tensile Modulus (ISO 527, 1 mm/min) | 3540 MPa | 1510 MPa |
| Flexural Modulus (ISO 527, 50 mm/min) | 67 MPa | 28 MPa |
| Bonding Modulus (ISO 178, 2 mm/min) | 1419 MPa | 3430 MPa |
| Heat Deflection Temperature (ISO 75/A) | 60° C. | 54° C. |
| Charpy notched Impact Strength (ISO 179, 1eA) | 1.9 kJ·m$^2$ | 1.6 kJ/m$^2$ |
| Charpy unnotched Impact Strength (ISO 179, 1eU) | 107 kJ/m$^2$ | 17 kJ/m$^2$ |

Mixtures of the materials in Table 8 were melt blended using a Berstorff ZE 34 Basic single screw extruder, available from Krauss Maffei, Hanover, Germany. The extruder utilizes 8 heating zones. For these examples, zone 1 in each case was 50° C., melting zones 2 and 3 were set to the same temperature and mixing zones 4, 5, 6, 7 and 8 were all set to the same temperature according to Table 9. The poly alpha-1,3-glucan, the polymer and additive were combined and thoroughly mixed prior to introducing the mixture into zone 1 of the extruder. In Table 9, PP means polypropylene and PLA means polylactic acid. Additive #1 means FUSA-BOND® P353 ethylene copolymer, Additive #2 is FUSA-BOND® N525 ethylene copolymer and Additive #3 is ELVALOY® 4170 elastomeric terpolymer. Each of the additives are available from E.I. DuPont de Nemours and Company, Wilmington, Del. The weight percentages are based on the total weight of the polymer, the poly alpha-1,3-glucan and the additive.

TABLE 8

| Example | Temperature, ° C. (zones 2-3/4-8) | Polymer, wt % | poly alpha-1,3-glucan (wt %) | Additive #, wt % |
|---|---|---|---|---|
| J | 200/180 | PP, 100 | none | none |
| 8a | 200/180 | PP, 67 | 30 | #1, 3 |
| 8b | 200/180 | PP, 65 | 30 | #1, 5 |
| 8c | 200/180 | PP, 62 | 30 | #1, 8 |
| 8d | 220/200 | PP, 62 | 30 | #1, 8 |
| 8e | 230/220 | PP, 62 | 30 | #1, 8 |
| 8f | 230/220 | PP, 67 | 30 | #1, 3 |
| 8g | 230/220 | PP, 62 | 30 | #2, 8 |
| 8h | 240/230 | PP, 62 | 30 | #1, 8 |
| 8i | 240/230 | PP, 67 | 30 | #1, 3 |
| 8j | 240/230 | PP, 42 | 50 | #1, 8 |
| 8k | 240/230 | PP, 47 | 50 | #1, 3 |
| 9a | 220/200 | PLA, 70 | 30 | none |
| K | 220/200 | PLA, 100 | 0 | 0 |
| 9b | 220/200 | PLA, 68 | 30 | #3, 2 |
| 9c | 220/200 | PLA, 60 | 30 | #3, 10 |

The resulting polymeric blend compositions were dried at 80° C. for 24 or 48 hours. and then tested for melt flow index according to ISO 1133 (190° C. and 2.16 Kg), Tensile modulus and tensile strength, according to DIN EN ISO 527-2, bending modulus, according to DIN EN ISO 178, Charpy Impact Strength, according to DIN EN ISO 179-1/1eU and DIN EN ISO 179-1/1eA, and Heat Deflection Temperature, according to DIN EN ISO 75-2. The results are given in Table 9.

TABLE 9

| Example | MF (g/10 min) | Tensile Mod. (GPa) | Tensile Str (MPa) | Bending Mod (MPa) | Charpy Impact (kJ/m$^2$) (Unnotched) | Charpy Impact (kJ/m$^2$) (Notched) | Heat Distortion temp (° C.) |
|---|---|---|---|---|---|---|---|
| J | 45.08 | 1.510 | 28.70 | 1.410 | 107.59 | 1.91 | 58.47 |
| 8a | 24.99 | 1.830 | 27.90 | 1.780 | 38.15 | 0.93 | 67.20 |
| 8b | 26.37 | 1.810 | 27.70 | 1.720 | 41.89 | 0.92 | 63.83 |
| 8c | 27.79 | 1.780 | 27.70 | 1.710 | 31.44 | 0.88 | 63.27 |
| 8d | 28.19 | 1.790 | 27.90 | 1.730 | 24.33 | 0.90 | 62.47 |
| 8e | 31.96 | 1.680 | 27.70 | 1.620 | 50.00 | 0.95 | 64.30 |
| 8f | 29.16 | 1.780 | 27.80 | 1.740 | 33.72 | 0.93 | 62.80 |
| 8g | 6.00 | 1.290 | 15.50 | 1.290 | 48.27 | 2.22 | 54.77 |
| 8h | 26.11 | 1.710 | 28.40 | 1.720 | 62.94 | 1.83 | 62.03 |
| 8i | 20.17 | 1.810 | 28.60 | 1.830 | 60.20 | 1.76 | 62.43 |
| 8j | 10.12 | 2.210 | 30.00 | 2.240 | 53.69 | 1.98 | 74.03 |
| 8k | 7.16 | 2.440 | 30.60 | 2.460 | 49.47 | 1.96 | 75.90 |
| K | 39.05 | 3.540 | 67.30 | 3.430 | 17.27 | 1.62 | 54.10 |
| 9a | 20.48 | 4.090 | 55.40 | 3.810 | 11.96 | 0.81 | 54.57 |
| 9b | 18.16 | 4.080 | 55.40 | 3.750 | 10.77 | 0.79 | 54.58 |
| 9c | 13.13 | 3.180 | 44.50 | 3.060 | 20.44 | 0.81 | 53.43 |

Examples 10a-10d

An ethylene/methacrylic acid copolymer having a melt flow index of 330 grams/10 minutes before neutralization and 1.2 grams/10 minutes after neutralization and comprising 81 percent by weight ethylene and 19 percent by weight of methacrylic acid and having about 60 percent by weight of the acid groups neutralized with sodium cations was produced.

Polymeric blend Compositions of alpha-1,3-glucan at 10, 20, 30 and 40 wt. % loading with respect to neutralized ethylene methacrylic acid copolymer were produced, to give Examples 10a, 10b, 10c and 10d, respectively. Solutions having about 20% by weight concentration of the neutralized ethylene/methacrylic acid copolymer were produced by dispersing the polymer in water, the percentage by weight is based on the total amount of the water and the neutralized ethylene/methacrylic acid copolymer.

Separately, dispersions of a poly alpha-1,3-glucan were prepared using a 40% by weight wet cake (40% poly alpha-1,3-glucan/60% water). Four different solutions were prepared, using 100 milliliters of water for each example. 5.575 grams of the wet cake were used for example 10a, 12.5 grams for example 10b, 21.25 grams for example 10c, and 33.325 grams for example 10d. Each mixture was stirred and sonicated using probe sonication (amplitude 60% with a probe tip diameter of 13 millimeters) for 8 to 9 hours. Portions of the neutralized ethylene/methacrylic acid copolymer solution were then added to each poly alpha-1,3-glucan dispersion so that example 10a was 10% poly alpha-1,3-glucan/90% neutralized ethylene/methacrylic acid copolymer; example 10b was 20% poly alpha-1,3-glucan/80% neutralized ethylene/methacrylic acid copolymer; example 10c was 30% poly alpha-1,3-glucan/70% neutralized ethylene/methacrylic acid copolymer; and example 10d was 40% poly alpha-1,3-glucan/60% neutralized ethylene/methacrylic acid copolymer. The percentages by weight are based on the total amounts of the polymer in the dispersions. After mixing, the dispersions were stirred overnight and subsequently sonicated for 30-60 minutes.

The resulting dispersions were cast into glass petri dishes and dried at 70-90° C. for 20 to 60 minutes, followed by 50° C. for 3 to 4 days. The resulting solid blends were then further dried at a pressure of 400 millibar at 35 to 50° C. for 2 days. Examples 10a, 10b, 10c and 10d were then hot pressed in a CARVER™ Press 4122 (available from Carver, Inc., Wabash, Ind.). Each sample was pressed at 135° C. between two KAPTON® polyimide sheets (available from E.I. du Pont de Nemours and Company, Wilmington, Del.). Each sample was first pressed between the sheets with no pressure applied for 1-2 minutes, followed by a regime that included 5 iterations of 6-9 metric tons of pressure for 1 to 2 minutes and release. Finally, each sample was pressed with 9 metric tons of pressure for 3 minutes. The sample was then removed from the press and allowed to cool to room temperature to give films of the polymeric blend compositions. A sample of the neutralized ethylene/methacrylic acid copolymer was prepared in a similar manner to give a control sample.

Each of the polymeric blend composition films were then tested for Tensile strength and modulus (ASTM 882-02), Storage modulus at 25° C. and 90° C., Creep and Creep after recovery. Tensile tests were performed using an INSTRON® model 5967 tensile testing machine with a 1 kilo Newton (kN) load cell at room temperature with a cross head speed of 50 mm/minute and a gap between the grips of 50 millimeters. Storage modulus was determined using a TA instrument DMA Q800 dynamic mechanical analyzer in thin film tension mode. The samples were cut into rectangular specimens 25 mm long, 5 mm wide and 0.2 mm thick. The samples were subjected to an amplitude of 20 micrometers at a frequency of 1 Hz, with a temperature of −140° C. to 120° C. at a heating rate of 3° C./minute. Creep tests were performed on the DMA Q800 dynamic mechanical analyzer in tensile mode at 65° C. and an applied stress level of 1.0 MPa. Rectangular specimens 25 mm long, 5 mm wide and 0.2 mm thick were subjected to 1.0 MPa creep stress for 20 minutes at 65° C. and then the samples were relaxed for 30 minutes. The results of the testing for examples 10a, 10b, 10c, 10d and a similarly prepared sample of the neutralized ethylene/methacrylic acid copolymer are given in Table 10.

TABLE 10

|  | Control | 10a | 10b | 10c | 10d |
|---|---|---|---|---|---|
| Tensile strength (MPa) | 16 | 19.6 | 22.6 | 23.2 | 26.4 |
| Tensile Modulus (GPa) | 0.4 | 1.0 | 1.4 | 1.7 | 1.9 |
| Storage Modulus at 25° C. (MPa) | 594 | n/a | 771 | 908 | 1260 |
| Storage Modulus at 90° C. (MPa) | 2.5 | n/a | 9.4 | 43 | 41 |
| Creep (Strain %) 1 MPa for 20 minutes at 65° C. | 229 | 114 | 47 | 9.8 | 9.5 |
| Creep (Strain %) after recovery | 106 | 69 | 29 | 5.7 | 5.9 |
| % Light transmission @ 400 nm | 93.6 | n/a | 72.88 | 48.11 | 47.48 |
| % Light transmission @ 650 nm | 94.8 | n/a | 92.0 | 90.6 | 89.0 |

The results in TABLE 10 show that tensile strength, tensile modulus and storage modulus (at 25° C. and at 90° C.) all increase with increasing amount of the poly alpha-1,3-glucan.

Preparation of Poly Alpha-1,3-Glucan #2

Poly alpha-1,3-glucan was prepared using a gtfJ enzyme preparation as described in U.S. Pat. No. 9,080,195, which is incorporated herein by reference in its entirety.

Comparative Example L

ZYTEL® 151, polyamide (nylon 6,12, available from E.I. du Pont de Nemours and Co., Wilmington, Del.) was dried at 90° C. under vacuum overnight The dried polymer was then continuously fed and mixed in a twin screw extruder (30 mm Coperion, 9 blocks) at a rate of 28.5 pounds per hour (pph). The extrusion was carried out in a continuous process with barrel temperature of about 210° C. and a screw speed of 200 revolutions per minute (rpm). Tensile test bars were prepared and tested following ASTM 638.

Examples 11a-11d

A polymeric blend composition was made by continuously feeding and mixing in a twin screw extruder (30 mm Coperion, 9 blocks) 1.5 pph of poly alpha-1,3-glucan #2 and 28.5 pph of ZYTEL® 151 polyamide as described in Comparative Example L. The mixing was carried out in a continuous process with barrel temperature of about 210° C. and screw speed of 200 revolutions per minute (rpm). The resulting polymeric blend composition was 5% by wt. poly alpha-1,3-glucan and was labeled as Example 11a. ZYTEL® 151 was fed into the rear of the extruder, and poly alpha-1,3 glucan #2 was fed at the side of the extruder. Another polymeric blend composition was made by feeding 3 pph poly alpha-1,3-glucan #2 with 27 pph of ZYTEL® 151 using similar conditions as for Example 11a. The resulting compounded polymeric blend composition was 10% by wt.

poly alpha-1,3-glucan, and was labeled as Example 11b. The ZYTEL® 151 pellets were fed using a main rear feeder at 24.3 pph and a secondary side feeder to help carry the poly alpha-1,3 glucan #2 into the extruder at 2.7 pph. Another polymeric blend composition was made by feeding 6 pph poly alpha-1,3-glucan #2 with 24 pph of ZYTEL® 151 using similar conditions as for Example 11a. The resulting compounded polymeric blend composition was 20% by wt. poly alpha-1,3-glucan, and was labeled as Example 11c. The ZYTEL® 151 pellets were fed using a main rear feeder at 21.6 pph and a secondary side feeder to help carry the poly alpha-1,3 glucan #2 into the extruder at 2.4 pph. Another polymeric blend composition was made by feeding 9 pph poly alpha-1,3-glucan #2 with 21 pph of ZYTEL® 151 using similar conditions as for Example 11a. The resulting compounded polymeric blend composition was 30% by wt. poly alpha-1,3-glucan, and was labeled as Example 11d. The ZYTEL® 151 pellets were fed using a main rear feeder at 18.9 pph and a secondary side feeder to help carry the poly alpha-1,3 glucan #2 into the extruder at 2.1 pph). Tensile test bars were prepared and tested following ASTM 638.

Comparative Example M

ZYTEL® 158 polyamide (nylon 6,12, available from E.I. du Pont de Nemours and Co., Wilmington, Del.) was dried at 90° C. under vacuum overnight then continuously fed and mixed in a twin screw extruder (30 mm Coperion, 9 blocks) at a rate of 28.5 pounds per hour (pph). The extrusion was carried out in a continuous process with barrel temperature of about 210° C. and a screw speed of 200 revolutions per minute (rpm). Tensile test bars were prepared and tested following ASTM 638. The test results can be found in Table 11.

Examples 12a-12e

A polymeric blend composition was made by continuously feeding and mixing in a twin screw extruder (30 mm Coperion, 9 blocks) 1.5 pph of poly alpha-1,3-glucan #2 and 28.5 pph of ZYTEL® 158 as described in Comparative Example M. The mixing was carried out in a continuous process with barrel temperature of about 210° C. and screw speed of 200 revolutions per minute (rpm). The resulting polymeric blend composition was 5% by wt. poly alpha-1,3-glucan and was labeled as Example 12a. ZYTEL® 158 was fed into the rear of the extruder, and poly alpha-1,3 glucan was fed at the side of the extruder. Another polymeric blend composition was made by feeding 3 pph poly alpha-1,3-glucan #2 with 27 pph of ZYTEL®158 using similar conditions as for Example 12a. The resulting compounded polymeric blend composition was 10% by wt. poly alpha-1,3-glucan, and was labeled as Example 12b. The ZYTEL® 158 pellets were fed using a main side feeder at 24.3 pph and a secondary side feeder to help carry the poly alpha-1,3 glucan #2 into the extruder at 2.7 pph. Another polymeric blend composition was made by feeding 6 pph poly alpha-1,3-glucan #2 with 24 pph of ZYTEL® 158 using similar conditions as for Example 12a. The resulting compounded polymeric blend composition was 20% by wt. poly alpha-1,3-glucan, and was labeled as Example 12c. The ZYTEL® 158 pellets were fed using a main side feeder at 21.6 pph and a secondary side feeder to help carry the poly alpha-1,3 glucan #2 into the extruder at 2.4 pph. Another polymeric blend composition was made by feeding 9 pph poly alpha-1,3-glucan #2 with 21 pph of ZYTEL® 158 using similar conditions as for Example 12a. The resulting compounded polymeric blend composition was 30% by wt. poly alpha-1,3-glucan, and was labeled as Example 12d. The ZYTEL® 158 pellets were fed using a main side feeder at 18.9 pph and a secondary side feeder to help carry the poly alpha-1,3 glucan #2 into the extruder at 2.1 pph. Another polymeric blend composition was made by feeding 6 pph poly alpha-1,3-glucan #2 with 9 pph of ZYTEL® 158 using similar conditions as for Example 12a. The resulting compounded polymeric blend composition was 40% by wt. poly alpha-1,3-glucan, and was labeled as Example 12e. The ZYTEL® 158 pellets were fed using a main rear feeder at 8.1 pph and a secondary side feeder to help carry the poly alpha-1,3 glucan #2 into the extruder at 0.9 pph. Tensile test bars were prepared and tested following ASTM 638. The test results can be found in Table 11.

Comparative N

A polyamide/nylon blend, ELVAMIDE® 8061 nylon multipolymer resin (available from E.I. Dupont de Nemours and Co., Wilmington, Del.) was dried at 90° C. under vacuum overnight then continuously fed and mixed in a twin screw extruder (30 mm Coperion, 9 blocks) at a rate of 28.5 pounds per hour (pph). The extrusion was carried out in a continuous process with barrel temperature of about 180° C. and a screw speed of 200 revolutions per minute (rpm). Tensile test bars were prepared and tested following ASTM 638. The test results can be found in Table 11.

Examples 13a-13d

A polymeric blend composition was made by continuously feeding and mixing in a twin screw extruder (30 mm Coperion, 9 blocks) 1.5 pph of poly alpha-1,3-glucan #2 and 28.5 pph of ELVAMIDE® 8061 as described in Comparative Example N. The mixing was carried out in a continuous process with Barrel temperature of about 180° C. and screw speed of 200 revolutions per minute (rpm). The resulting polymeric blend composition was 5% by wt. poly alpha-1,3-glucan and was labeled as Example 13a. ELVAMIDE® 8061 was fed into the rear of the extruder, and poly alpha-1,3 glucan #2 was fed at the side of the extruder. Another polymeric blend composition was made by feeding 3 pph poly alpha-1,3-glucan #2 with 27 pph of ELVAMIDE® 8061 using similar conditions as for Example 13a. The resulting compounded polymeric blend composition was 10% by wt. poly alpha-1,3-glucan, and was labeled as Example 13b. The ELVAMIDE® 8061 pellets were fed using a main side feeder at 24.3 pph and a secondary side feeder to help carry the poly alpha-1,3-glucan #2 into the extruder at 2.7 pph. Another polymeric blend composition was made by feeding 6 pph poly alpha-1,3-glucan #2 with 24 pph of ELVAMIDE® 8061 using similar conditions as for Example 13a. The resulting compounded polymeric blend composition was 20% by wt. poly alpha-1,3-glucan, and was labeled as Example 13c. The ELVAMIDE® 8061 pellets were fed using a main side feeder at 21.6 pph and a secondary side feeder to help carry the poly alpha-1,3-glucan #2 into the extruder at 2.4 pph. Another polymeric blend composition was made by feeding 9 pph poly alpha-1,3-glucan #2 with 21 pph of ELVAMIDE® 8061 using similar conditions as for Example 13a. The resulting compounded polymeric blend composition was 30% by wt. poly alpha-1,3-glucan, and was labeled as Example 13d. The ELVAMIDE® 8061 pellets were fed using a main side feeder at 18.9 pph and a secondary side feeder to help carry the poly alpha-1,3- glucan #2 into the extruder at 2.1 pph. Tensile test bars were prepared and molded following ASTM 638. The test results can be found in Table 11.

Comparative O

A thermoplastic elastomer (HYTREL® 4069) (available from E.I. Dupont de Nemours and Co., Wilmington, Del.) was dried at 90° C. under vacuum overnight then continuously fed and mixed in a twin screw extruder (30 mm Coperion, 9 blocks) at a rate of 28.5 pounds per hour (pph). The extrusion was carried out in a continuous process with barrel temperature of about 230° C. and a screw speed of 200 revolutions per minute (rpm). Tensile test bars were prepared and tested following ASTM 638. The test results can be found in Table 11.

Examples 14a-14e

A polymeric blend composition was made by continuously feeding and mixing in a twin screw extruder (30 mm Coperion, 9 blocks) 1.5 pph of poly alpha-1,3-glucan #2 and 28.5 pph of HYTREL® 4069 as described in Comparative Example O. The mixing was carried out in a continuous process with Barrel temperature of about 230° C. and screw speed of 200 revolutions per minute (rpm). The resulting polymeric blend composition was 5% by wt. poly alpha-1,3-glucan and was labeled as Example 14a. HYTREL® 4069 was fed into the rear of the extruder, and poly alpha-1,3 glucan was fed at the side of the extruder. Another polymeric blend composition was made by feeding 3 pph poly alpha-1,3-glucan #2 with 27 pph of HYTREL® 4069 using similar conditions as for Example 13a. The resulting compounded polymeric blend composition was 10% by wt. poly alpha-1,3-glucan, and was labeled as Example 14b. The HYTREL® 4069 pellets were fed using a main side feeder at 24.3 pph and a secondary side feeder to help carry the poly alpha-1,3-glucan into the extruder at 2.7 pph. Another polymeric blend composition was made by feeding 6 pph poly alpha-1,3-glucan #2 with 24 pph of HYTREL® 4069 using similar conditions as for Example 14a. The resulting compounded polymeric blend composition was 20% by wt. poly alpha-1,3-glucan, and was labeled as Example 14c. The HYTREL® 4069 pellets were fed using a main side feeder at 21.6 pph and a secondary side feeder to help carry the poly alpha-1,3-glucan into the extruder at 2.4 pph. Another polymeric blend composition was made by feeding 9 pph poly alpha-1,3-glucan #2 with 21 pph of HYTREL® 4069 using similar conditions as for Example 14a. The resulting compounded polymeric blend composition was 30% by wt. poly alpha-1,3-glucan, and was labeled as Example 14d. The HYTREL® 4069 pellets were fed using a main side feeder at 18.9 pph and a secondary side feeder to help carry the poly alpha-1,3-glucan into the extruder at 2.1 pph). Another polymeric blend composition was made by feeding 6 pph poly alpha-1,3-glucan with 9 pph of HYTREL® 4069 using similar conditions as for Example 14a. The resulting compounded polymeric blend composition was 40% by wt. poly alpha-1,3-glucan, and was labeled as Example 14e. The HYTREL® 4069 pellets were fed using a main rear feeder at 8.1 pph and a secondary side feeder to help carry the poly alpha-1,3-glucan into the extruder at 0.9 pph. Tensile test bars were prepared and molded following ASTM 638. The test results can be found in Table 11.

Comparative P

A thermoplastic elastomer (HYTREL® 5556) (available from E.I. Dupont de Nemours and Co., Wilmington, Del.) was dried at 90° C. under vacuum overnight then continuously fed and mixed in a twin screw extruder (30 mm Coperion, 9 blocks) at a rate of 28.5 pounds per hour (pph). The extrusion was carried out in a continuous process with barrel temperature of about 230° C. and a screw speed of 200 revolutions per minute (rpm). Tensile test bars were prepared and molded following ASTM 638. The test results can be found in Table 11.

Examples 15a-15e

A polymeric blend composition was made by continuously feeding and mixing in a twin screw extruder (30 mm Coperion, 9 blocks) 1.5 pph of poly alpha-1,3-glucan #2 and 28.5 pph of HYTREL® 5556 as described in Comparative Example P. The mixing was carried out in a continuous process with barrel temperature of about 230° C. and screw speed of 200 revolutions per minute (rpm). The resulting polymeric blend composition was 5% by wt. poly alpha-1,3-glucan and was labeled as Example 15a. HYTREL® 5556 was fed into the rear of the extruder, and poly alpha-1,3 glucan was fed at the side of the extruder. Another polymeric blend composition was made by feeding 3 pph poly alpha-1,3-glucan #2 with 27 pph of HYTREL® 5556 using similar conditions as for Example 15a. The resulting compounded polymeric blend composition was 10% by wt. poly alpha-1,3-glucan, and was labeled as Example 15b. The HYTREL® 5556 pellets were fed using a main side feeder at 24.3 pph and a secondary side feeder to help carry the poly alpha-1,3-glucan into the extruder at 2.7 pph. Another polymeric blend composition was made by feeding 6 pph poly alpha-1,3-glucan #2 with 24 pph of HYTREL® 5556 using similar conditions as for Example 15a. The resulting compounded polymeric blend composition was 20% by wt. poly alpha-1,3-glucan, and was labeled as Example 15c. The HYTREL® 5556 pellets were fed using a main side feeder at 21.6 pph and a secondary side feeder to help carry the poly alpha-1,3-glucan into the extruder at 2.4 pph. Another polymeric blend composition was made by feeding 9 pph poly alpha-1,3-glucan #2 with 21 pph of HYTREL® 5556 using similar conditions as for Example 15a. The resulting compounded polymeric blend composition was 30% by wt. poly alpha-1,3-glucan, and was labeled as Example 15d. The HYTREL® 5556 pellets were fed using a main side feeder at 18.9 pph and a secondary side feeder to help carry the poly alpha-1,3-glucan into the extruder at 2.1 pph. Another polymeric blend composition was made by feeding 6 pph poly alpha-1,3-glucan #2 with 9 pph of HYTREL® 5556 using similar conditions as for Example 15a. The resulting compounded polymeric blend composition was 40% by wt. poly alpha-1,3-glucan, and was labeled as Example 5e. The HYTREL® 5556 pellets were fed using a main rear feeder at 8.1 pph and a secondary side feeder to help carry the poly alpha-1,3-glucan into the extruder at 0.9 pph. Tensile test bars were prepared and molded following ASTM 638. The test results can be found in Table 11.

Comparative Q

A polyester polymer (SORONA® K1171) (available from E.I. Dupont de Nemours and Co., Wilmington, Del.) was dried at 90° C. under vacuum overnight then continuously fed and mixed in a twin screw extruder (18 mm Coperion, 7 blocks) at a rate of 15 pounds per hour (pph). The extrusion was carried out in a continuous process with barrel temperature of about 235° C. and a screw speed of 160 revolutions per minute (rpm). Tensile test bars were prepared and molded following ASTM 638. The test results can be found in Table 11.

Examples 16a-16d

A polymeric blend composition was made by continuously feeding and mixing in a twin screw extruder (18 mm Coperion, 7 blocks) 1 pph of poly alpha-1,3-glucan #2 and 19 pph of SORONA® K1171 as described in Comparative Example Q. The mixing was carried out in a continuous process with Barrel temperature of about 235° C. and screw speed of 160 revolutions per minute (rpm). The resulting polymeric blend composition was 5% by wt. poly alpha-1,3-glucan and was labeled as Example 16a. SORONA® K1171 was fed into the rear of the extruder, and poly alpha-1,3 glucan was fed at the side of the extruder. Another polymeric blend composition was made by feeding 2 pph poly alpha-1,3-glucan #2 with 18 pph of SORONA® K1171 using similar conditions as for Example 16a. The resulting compounded polymeric blend composition was 10% by wt. poly alpha-1,3-glucan, and was labeled as Example 16b. Another polymeric blend composition was made by feeding 4 pph poly alpha-1,3-glucan #2 with 16 pph of SORONA® K1171 using similar conditions as for Example 16a. The resulting compounded polymeric blend composition was 20% by wt. poly alpha-1,3-glucan, and was labeled as Example 16c. Another polymeric blend composition was made by feeding 4.5 pph poly alpha-1,3-glucan #2 with 10.5 pph of SORONA® K1171 using similar conditions as for Example 16a. The resulting compounded polymeric blend composition was 30% by wt. poly alpha-1,3-glucan, and was labeled as Example 16d. Tensile test bars were prepared and molded following ASTM 638. The test results can be found in Table 11.

TABLE 11

| Example | Polymer | Polymer (%) | Glucan (%) | Tensile (ksi) | Elongation (%) | Modulus (ksi) |
|---|---|---|---|---|---|---|
| Comparative L | ZYTEL® 151 | 100 | 0 | 5.861 | 28.31 | 373.183 |
| 11a | | 95 | 5 | 9.358 | 14.59 | 383.733 |
| 11b | | 90 | 10 | 6.843 | 2.05 | 409.105 |
| 11c | | 80 | 20 | 5.678 | 1.54 | 466.294 |
| 11d | | 70 | 30 | 5.905 | 1.43 | 476.878 |
| M | ZYTEL® 158 | 100 | 0 | 4.19 | 45.73 | 375.61 |
| 12a | | 95 | 5 | 6.243 | 35.09 | 368.847 |
| 12b | | 90 | 10 | 8.415 | 6.27 | 418.794 |
| 12c | | 80 | 20 | 8.227 | 2.87 | 416.569 |
| 12d | | 70 | 30 | 7.463 | 2.093 | 446.106 |
| 12e | | 60 | 40 | 8.126 | 1.79 | 510.451 |

| | | | | Stress at Yield (ksi) | Elongation at Yield (%) | Modulus (ksi) |
|---|---|---|---|---|---|---|
| Comparative N | ELVAMIDE® 8061 | 100 | 0 | 5.829 | 5.56 | 185.813 |
| 13a | | 95 | 5 | 5.457 | 4.94 | 197.733 |
| 13b | | 90 | 10 | 6.605 | 4.87 | 217.093 |
| 13c | | 80 | 20 | 7.061 | 4.7 | 236.179 |
| 13d | | 70 | 30 | 8.226 | 4.58 | 277.185 |
| Comparative O | HYTREL® 4069 | 100 | 0 | 1.092 | 72.629 | 4.474 |
| 14a | | 95 | 5 | 1.136 | 119.571 | 4.913 |
| 14b | | 90 | 10 | 1.116 | 99.945 | 5.969 |
| 14c | | 80 | 20 | 1.046 | 93.148 | 7.852 |
| 14d | | 70 | 30 | 1.008 | 73.176 | 11.486 |
| 14e | | 60 | 40 | 0.994 | 15.799 | 15.657 |
| Comparative P | HYTREL® 5556 | 100 | 0 | 2.28475 | 34.83675 | 21.55175 |
| 15a | | 95 | 5 | 2.2002 | 34.9604 | 27.5036 |
| 15b | | 90 | 10 | 2.207 | 33.041 | 30.799 |
| 15c | | 80 | 20 | 2.016 | 30.142 | 39.712 |
| 15d | | 70 | 30 | 1.822 | 18.308 | 56.152 |
| 15e | | 60 | 40 | 1.799 | 6.803 | 74.752 |

| | | | | Tensile (ksi) | Elongation (%) | Modulus (ksi) |
|---|---|---|---|---|---|---|
| Comparative Q | SORONA® K1171 | 100 | 0 | 8.575 | 15.42 | 436.349 |
| 16a | | 95 | 5 | 4.183 | 1.05 | 417.073 |
| 16b | | 90 | 10 | 3.985 | 0.96 | 427.324 |
| 16c | | 80 | 20 | 4.148 | 0.92 | 468.077 |
| 16d | | 70 | 30 | 5.589 | 0.97 | 512.965 |

Comparative R

REPOL® H050MN polypropylene, available from Reliance Industries, India Ltd., was dried overnight at 70° C. in vacuum oven and then melt processed in batch mixer with two horizontally positioned counter-rotating roller blades (Brabender PLASTICORDER® GmbH & Co. KG, Duisburg, Germany; mixer type 50EHT) at 190° C. for 10 minutes at 75 rpm. The melt processed samples were injection molded using Thermo Scientific HAAKE MiniJet, Germany to make tensile bars and data is tested following ASTM 638 and tabulated in Table 13.

Examples 17a-17h

Freeze dried glucans were made by dispersing a 40% by weight wet cake comprising 40% poly alpha-1,3-glucan and 60% water in water at concentration of 1 g of the poly alpha-1,3-glucan wet cake in 100 ml of water. The dispersion was sonicated for 7-9 hours using a VIBRA CELL™ ultrasonic processor (available from Sonics & Materials, Inc., Newtown, Conn.) at 60% amplitude and probe tip diameter of 13 mm. Then, the dispersion was subjected to freeze drying using a Sacvac 110 4pro freeze drier with an initial temperature of 25° C. and a condenser temperature of −110° C. to obtain a freeze-dried poly alpha-1,3-glucan. The freeze-dried poly alpha-1,3-glucan was held at 70° C. overnight in vacuum oven before further processing.

Melt blended mixtures of polypropylene, the freeze dried poly alpha-1,3-glucan and FUSABOND® P613 maleic anhydride grafted polypropylene (available from E.I. Dupont de Nemours and Co., Wilmington, Del.) were prepared by blending the ingredients of TABLE 12 using a batch mixer having counter-rotating roller blades (Brabender PlastiCorder® GmbH & Co. KG, Duisburg, Germany; mixer type 50EHT) at 190° C. for 10-15 minutes at 75 rpm. For example, to prepare example 17a, 1.0 wt % poly alpha-1,3-glucan, 36.97 g of polypropylene and 0.37 g of the freeze dried poly alpha-1,3-glucan were added. In some compositions, FUASBOND® P613, maleic anhydride grafted polypropylene was added during melt blending of polypropylene and poly alpha-1,3-glucan. For example, first polypropylene was melted and then FUASBOND P613 was added followed by incorporation of poly alpha-1,3-glucan. The blends were removed in the melt state from the mixer using a scraper, and were allowed to cool to room temperature.

TABLE 12

| Example | Materials in wt % | | | Materials in grams | | |
|---|---|---|---|---|---|---|
| | Polypropylene, wt % | poly alpha-1,3-glucan (wt %) | FUSABOND® P613, wt % | Polymer, (g) | poly alpha-1,3-glucan (g) | FUSABOND® P613, (g) |
| R | PP, 100 | 0 | 0 | 37.35 | 0 | 0 |
| 17a | PP, 99 | 1 | 0 | 36.97 | 0.37 | 0 |
| 17b | PP, 97 | 3 | 0 | 36.18 | 1.11 | 0 |
| 17c | PP, 95 | 5 | 0 | 35.48 | 1.87 | 0 |
| 17d | PP, 80 | 20 | 0 | 29.88 | 7.47 | 0 |
| 17e | PP, 79 | 20 | 1 | 29.50 | 7.47 | 0.37 |
| 17f | PP, 58 | 40 | 2 | 21.66 | 14.94 | 0.75 |
| 17g | PP, 45 | 50 | 5 | 16.81 | 18.67 | 1.87 |
| 17h | PP, 35 | 60 | 5 | 13.07 | 22.41 | 1.87 |

The melt processed blends were injection molded (Injection molding conditions: Temperature ~190° C., mold temperature 75° C., injection pressure ~750 bar and injection time 7 sec.) into dog-bone shape samples using Thermo Scientific HAAKE MiniJet, Germany and the data was tested following ASTM 638 and ASTM D256 and the data was tabulated in Table 13.

TABLE 13

| Example | Tensile Modulus (MPa) | Tensile Strength (MPa) | Tensile strain at yield (%) | Izod notched impact strength, kJ/m² |
|---|---|---|---|---|
| R | 1642 | 42.2 | 9.49 | 2.8 |
| 17a | 1875 | 45.3 | 7.78 | 3.52 |
| 17b | 1814 | 45.05 | 8.46 | 2.31 |
| 17c | 1550 | 43.02 | 7.58 | 2.19 |
| 17d | 2075 | 35.00 | 4.92 | n/a |
| 17e | 2386 | 38.00 | 4.79 | 2.46 |

TABLE 13-continued

| Example | Tensile Modulus (MPa) | Tensile Strength (MPa) | Tensile strain at yield (%) | Izod notched impact strength, kJ/m² |
|---|---|---|---|---|
| 17f | 2438 | 40 | 2.72 | 1.29 |
| 17g | 2819 | 42 | 2.18 | 1.27 |
| 17h | 3415 | 40.8 | 2.49 | 1.62 |

The melt processed blends were injection molded (Injection molding conditions: Temperature ~190° C., mold temperature 75° C., injection pressure ~750 bar and injection time 7 sec.) into dog-done shape samples using Thermo Scientific HAAKE MiniJet, Germany and the data was tested following ASTM 638 and tabulated in Table 13. It was observed that addition of freeze dried poly alpha-1,3-glucan increased the tensile modulus of polypropylene.

Comparative S

Ethylene vinyl-alcohol copolymer (EVOH) (Grade: H171B with melt flow index 1.7 g/10 min (ISO 1133)) obtained from Kuraray was dried at 80°-90° C. overnight in vacuum oven and then melt processed in batch mixer with two horizontally positioned counter-rotating roller blades (Brabender PLASTICORDER® GmbH & Co. KG, Duisburg, Germany; mixer type 50EHT) at 190° C. for 10 minutes at 75 rpm. The melt processed samples were hot pressed using Carver™ Press (Model 4122, Carver Inc. USA) to make thin films to test for storage modulus and glass transition temperature using Dynamic mechanical analysis (Model Q800, TA instrument, USA).

Examples 18a-18c

Freeze dried glucans were made by dispersing a 40% by weight wet cake comprising 40% poly alpha-1,3-glucan and 60% water in water at concentration of 1 g of the poly alpha-1,3-glucan wet cake in 100 ml of water. The dispersion was sonicated for 7-9 hours using a VIBRA CELL™ ultrasonic processor (available from Sonics & Materials, Inc., Newtown, Conn.) at 60% amplitude and probe tip diameter of 13 mm. Then, the dispersion was subjected to freeze drying using a Sacvac 110 4pro freeze drier with an initial temperature of 25° C. and a condenser temperature of −110° C. to obtain a freeze-dried poly alpha-1,3-glucan. The freeze-dried poly alpha-1,3-glucan was held at 80° C. overnight in vacuum oven before further processing.

Polymeric blend compositions of Ethylene vinyl-alcohol copolymer and freeze dried poly alpha-1,3-glucan as described in described in Table 14 melt processed using a batch mixer having counter-rotating roller blades (Brabender PlastiCorder® GmbH & Co. KG, Duisburg, Germany; mixer type 50EHT) at 190° C. for 10-15 minutes at 75 rpm. For example, to prepare a composite 10.0 wt % poly alpha-1,3-glucan, 40.54 g of Ethylene vinyl-alcohol copolymer and 4.50 g of the freeze dried poly alpha-1,3-glucan were added. In melt processing, first, ethylene vinyl-alcohol copolymer, was melted and then poly alpha-1,3-glucan was added. The blends were removed in the melt state from the mixer using a scraper, and were allowed to cool to room temperature. The samples were collected and kept in desiccator for one day and then kept in vacuum oven at 80° C. before compression molding of samples to make films.

TABLE 14

| | Materials in wt % | | Materials in grams | |
|---|---|---|---|---|
| Example | Polymer, wt % | poly alpha-1,3-glucan (wt %) | EVOH Polymer, (g) | Poly alpha-1,3-glucan (g) |
| S | EVOH, 100 | 0 | 45.045 | 0 |
| 18a | EVOH, 90 | 10 | 40.54 | 4.50 |
| 18b | EVOH, 80 | 20 | 36.04 | 9.01 |
| 18c | EVOH, 70 | 35 | 29.28 | 15.77 |

The melt processed blends (Comparative S and Examples 18a-18c) thus prepared were dried overnight in vacuum oven at 80° C. The blends were finally pressed in a CARVER™ Press (Model 4122, Carver Inc. USA) at 180° C. for about 5-6 minutes under a pressure of 9 tons and then removed from the press and cooled to room temperature. The compression molded films thus obtained were tested for storage modulus and Glass transition temperature using Dynamic mechanical analysis (Model Q800, TA instrument, USA).

The storage modulus (E') and glass transition temperature (Tg) of Ethylene vinyl-alcohol copolymer/poly alpha-1,3-glucan blends were determined as a function of temperature by dynamic mechanical analysis (DMA) using a TA Instrument DMA Q 800 model in thin film tension mode. The films (25 mm×5 mm×0.2 mm) were subjected to amplitude of 20 μm at a frequency of 1 Hz at a temperature of about 0° C. to 200° C. at a heating rate of 3° C./minute. The results are summarized in Table 15. It was observed that storage modulus (E') increased with increase in wt % percentage of poly alpha-1,3-glucan in the blends.

Creep tests of the blends were conducted on a DMA Q800 analyzer (TA Instruments, USA) with tensile mode at 120° C. and applied stress level of 3.0 MPa. The rectangular specimens of the blend films (25 mm×5 mm×0.2 mm) were subjected to 3.0 MPa creep stress for 20 minutes at 120° C., and then samples were relaxed for 30 minutes. The results are summarised in Table 15. It was observed that as the poly alpha-1,3-glucan percentage in the blends increases, the creep resistance also increases.

TABLE 15

| Example | Storage Modulus (E') at 25° C. | Glass transition Temperature, ° C. | Creep (strain %) @ 3 MPa for 20 min at 120° C. |
|---|---|---|---|
| R | 2966 | 51 | 15.4 |
| 17a | 3144 | 69 | 13.0 |

TABLE 15-continued

| Example | Storage Modulus (E') at 25° C. | Glass transition Temperature, ° C. | Creep (strain %) @ 3 MPa for 20 min at 120° C. |
|---|---|---|---|
| 17b | 3184 | 79 | 6.8 |
| 17c | 3511 | 71 | 4.0 |

What is claimed is:

1. A polymeric blend composition comprising:
   (a) from about 1 to about 99 wt. % of a polymer; and
   (b) from about 1 to about 75 wt. % poly alpha-1,3-glucan,
   wherein the polymer is polyethylene, polypropylene, ethylene copolymer, polyvinyl butyrate, polylactic acid, polyvinyl alcohol, polyamide, polyether thermoplastic elastomer, polyester, polyether ester, ethylene vinyl alcohol copolymer, starch, or a combination thereof, wherein the tensile strength of the polymeric blend composition is increased between 10% and 100% as compared to the tensile strength of the polymer.

2. A polymeric blend composition comprising:
   (a) from about 1 to about 99 wt. % of a polymer; and
   (b) from about 1 to about 75 wt. % poly alpha-1,3-glucan,
   wherein the tensile modulus of the polymeric blend composition is increased between 10% and 400% as compared to the tensile modulus of the polymer.

3. A polymeric blend composition comprising:
   (a) from about 1 to about 99 wt. % of a polymer; and
   (b) from about 1 to about 75 wt. % poly alpha-1,3-glucan,
   wherein the oxygen transmission rate of the polymeric blend composition is decreased between 10% and less than 100% as compared to the oxygen transmission rate of the polymer.

4. A polymeric blend composition comprising:
   a polymer and poly alpha-1,3-glucan,
   wherein the polymer is polyethylene and the composition comprises 75 to 95 wt % polyethylene and 5 to 25 wt % poly alpha-1,3-glucan.

5. A polymeric blend composition comprising:
   a polymer and poly alpha-1,3-glucan,
   wherein the polymer is polypropylene and the composition comprises 35 to 95 wt % polypropylene and 5 to 65 wt % poly alpha-1,3-glucan.

6. A polymeric blend composition comprising:
   a polymer and poly alpha-1,3-glucan,
   wherein the polymer is polylactic acid and the composition comprises 55 to 95 wt % polylactic acid and 5 to 35 wt % poly alpha-1,3-glucan.

7. A polymeric blend composition comprising:
   a polymer and poly alpha-1,3-glucan,
   wherein the polymer is polyvinyl alcohol and the composition comprises 45 to 95 wt % polyvinyl alcohol and 5 to 55 wt % poly alpha-1,3-glucan.

8. A polymeric blend composition comprising:
   a polymer and poly alpha-1,3-glucan,
   wherein the polymer is starch and the composition comprises 85 to 95 wt % starch and 5 to 15 wt % poly alpha-1,3-glucan.

9. A polymeric blend composition comprising:
   a polymer and poly alpha-1,3-glucan,
   wherein the polymer is ethylene/methacrylic acid copolymer and the composition comprises 60 to 95 wt % ethylene/methacrylic acid copolymer and 5 to 40 wt % poly alpha-1,3-glucan.

10. A polymeric blend composition comprising:
a polymer and poly alpha-1,3-glucan,
wherein the polymer is a polyamide, and the composition comprises 65 to 95 wt % polyamide and 5 to 35 wt % poly alpha-1,3-glucan.

11. A polymeric blend composition comprising:
a polymer and poly alpha-1,3-glucan,
wherein the polymer is a polyether ester, and the composition comprises 55 to 95 wt % polyether ester and 5 to 45 wt % poly alpha-1,3-glucan.

12. A polymeric blend composition comprising:
a polymer and poly alpha-1,3-glucan,
wherein the polymer is a polyester, and the composition comprises 65 to 95 wt % polyester and 5 to 35 wt % poly alpha-1,3-glucan.

13. A polymeric blend composition comprising:
a polymer and poly alpha-1,3-glucan,
wherein the polymer is an ethylene vinyl alcohol copolymer, and the composition comprises 95 to 60 wt % of ethylene vinyl alcohol copolymer and 5 to 40 wt % poly alpha-1,3-glucan.

14. The polymeric blend composition of claim 4, wherein the composition further comprises one or more additives selected from pigments, surfactants, fillers, stabilizers, UV absorbers, dispersants, flame retardants, antimicrobial agents, or plasticizers.

15. The polymeric blend composition of claim 5, wherein the composition further comprises one or more additives selected from pigments, surfactants, fillers, stabilizers, UV absorbers, dispersants, flame retardants, antimicrobial agents, or plasticizers.

16. The polymeric blend composition of claim 6, wherein the composition further comprises one or more additives selected from pigments, surfactants, fillers, stabilizers, UV absorbers, dispersants, flame retardants, antimicrobial agents, or plasticizers.

17. The polymeric blend composition of claim 7, wherein the composition further comprises one or more additives selected from pigments, surfactants, fillers, stabilizers, UV absorbers, dispersants, flame retardants, antimicrobial agents, or plasticizers.

18. The polymeric blend composition of claim 8, wherein the composition further comprises one or more additives selected from pigments, surfactants, fillers, stabilizers, UV absorbers, dispersants, flame retardants, antimicrobial agents, or plasticizers.

19. The polymeric blend composition of claim 9, wherein the composition further comprises one or more additives selected from pigments, surfactants, fillers, stabilizers, UV absorbers, dispersants, flame retardants, antimicrobial agents, or plasticizers.

20. The polymeric blend composition of claim 10, wherein the composition further comprises one or more additives selected from pigments, surfactants, fillers, stabilizers, UV absorbers, dispersants, flame retardants, antimicrobial agents, or plasticizers.

21. The polymeric blend composition of claim 11, wherein the composition further comprises one or more additives selected from pigments, surfactants, fillers, stabilizers, UV absorbers, dispersants, flame retardants, antimicrobial agents, or plasticizers.

22. The polymeric blend composition of claim 12, wherein the composition further comprises one or more additives selected from pigments, surfactants, fillers, stabilizers, UV absorbers, dispersants, flame retardants, antimicrobial agents, or plasticizers.

23. The polymeric blend composition of claim 13, wherein the composition further comprises one or more additives selected from pigments, surfactants, fillers, stabilizers, UV absorbers, dispersants, flame retardants, antimicrobial agents, or plasticizers.

24. The polymeric blend composition of claim 1, wherein the polymer is polyvinyl alcohol.

25. The polymeric blend composition of claim 24, wherein the composition further comprises one or more additives selected from pigments, surfactants, fillers, stabilizers, UV absorbers, dispersants, flame retardants, antimicrobial agents, or plasticizers.

* * * * *